(12) United States Patent
Yoshida et al.

(10) Patent No.: US 8,742,895 B2
(45) Date of Patent: Jun. 3, 2014

(54) WIRELESS COMMUNICATION IMPROVING SHEET, WIRELESS COMMUNICATION IC TAG, INFORMATION TRANSMITTING MEDIUM AND WIRELESS COMMUNICATION SYSTEM

(75) Inventors: Takahiko Yoshida, Yamatokooriyama (JP); Masato Matsushita, Yamatokooriyama (JP); Haruhide Okamura, Yamatokooriyama (JP); Shinichi Sato, Yamatokooriyama (JP); Toshiharu Shimai, Yamatokooriyama (JP); Hiroaki Kogure, Tokyo (JP)

(73) Assignee: Nitta Corporation, Osaka (JP)

( * ) Notice: Subject to any disclaimer, the term of this patent is extended or adjusted under 35 U.S.C. 154(b) by 422 days.

(21) Appl. No.: 12/734,408

(22) PCT Filed: Oct. 31, 2008

(86) PCT No.: PCT/JP2008/069978
§ 371 (c)(1),
(2), (4) Date: Apr. 29, 2010

(87) PCT Pub. No.: WO2009/057789
PCT Pub. Date: May 7, 2009

(65) Prior Publication Data
US 2010/0245049 A1 Sep. 30, 2010

(30) Foreign Application Priority Data

Oct. 31, 2007 (JP) ................. 2007-284599

(51) Int. Cl.
*G08B 13/14* (2006.01)
*H04Q 5/22* (2006.01)
*H01Q 13/10* (2006.01)

(52) U.S. Cl.
USPC .................. 340/10.1; 340/572.1; 343/767

(58) Field of Classification Search
USPC ................. 340/572.7, 10.1–10.4; 235/435; 343/767
See application file for complete search history.

(56) References Cited

U.S. PATENT DOCUMENTS 5,001,492 A * 3/1991 Shapiro et al. ......... 343/700 MS
6,371,380 B1 * 4/2002 Tanimura ..................... 235/492
(Continued)

FOREIGN PATENT DOCUMENTS

CN 1926933 3/2007
EP 2 096 711 9/2009
(Continued)

OTHER PUBLICATIONS

International Preliminary Report on Patentability dated May 14, 2010.
(Continued)

*Primary Examiner* — Daniel Wu
*Assistant Examiner* — Mohamed Barakat
(74) *Attorney, Agent, or Firm* — Harness, Dickey & Pierce, P.L.C.

(57) ABSTRACT

A wireless communication improving sheet capable of improving a possible communication distance of an IC tag for wireless communication, a wireless communication IC tag, and a wireless communication system are provided. A first spacer has an arrangement surface for arranging a wireless IC tag. An auxiliary antenna, which resonates with respect to an electromagnetic wave used for wireless communication, is provided on a surface opposite to the arrangement surface of the first spacer. A second spacer is provided on an opposite side to the first spacer with the auxiliary antenna interposed therebetween. The first spacer and the auxiliary antenna is formed with a groove (a hole) having the second spacer as the bottom.

29 Claims, 22 Drawing Sheets

(56) References Cited

U.S. PATENT DOCUMENTS

| | | | |
|---|---|---|---|
| 6,563,463 B1* | 5/2003 | Saito | 343/700 MS |
| 7,075,493 B2* | 7/2006 | Azadegan et al. | 343/767 |
| 7,250,867 B2 | 7/2007 | Sakama et al. | |
| 7,268,736 B1* | 9/2007 | Tikhov et al. | 343/770 |
| 7,548,167 B2* | 6/2009 | Yamagajo et al. | 235/375 |
| 7,561,047 B2* | 7/2009 | Ogata et al. | 340/572.1 |
| 7,619,567 B2* | 11/2009 | Lynch et al. | 343/700 MS |
| 7,679,516 B2* | 3/2010 | Mori | 340/572.7 |
| 7,692,454 B2* | 4/2010 | Miura et al. | 327/65 |
| 7,804,439 B2* | 9/2010 | Yoshida et al. | 342/4 |
| 7,948,382 B2* | 5/2011 | Tuttle | 340/572.7 |
| 8,035,522 B2* | 10/2011 | Oroku et al. | 340/572.7 |
| 2005/0093678 A1 | 5/2005 | Forster et al. | |
| 2005/0140512 A1* | 6/2005 | Sakama et al. | 340/572.7 |
| 2006/0267843 A1 | 11/2006 | Sakama et al. | |
| 2008/0084259 A1 | 4/2008 | Yoshida et al. | |
| 2008/0106412 A1 | 5/2008 | Sakama et al. | |
| 2008/0257599 A1 | 10/2008 | Matsushita et al. | |

FOREIGN PATENT DOCUMENTS

| | | | |
|---|---|---|---|
| JP | 2000-236214 | | 8/2000 |
| JP | 2002-314284 | | 10/2002 |
| JP | 2003-060430 | | 2/2003 |
| JP | 3647446 | | 5/2005 |
| JP | 2005-159337 | | 6/2005 |
| JP | 2005-184012 | | 7/2005 |
| JP | 2005-210676 | | 8/2005 |
| JP | 2005-327245 | | 11/2005 |
| JP | 2005-354106 | | 12/2005 |
| JP | 2006-005365 | | 1/2006 |
| JP | 2006-128664 | | 5/2006 |
| JP | 2006-333403 | | 12/2006 |
| JP | 2007-143132 | | 6/2007 |
| JP | 2007143132 A | * | 6/2007 |
| JP | 2008-117165 | | 5/2008 |
| WO | WO 02/07085 | | 1/2002 |
| WO | WO 2007/000578 | | 1/2007 |
| WO | WO 2007/046527 | | 4/2007 |

OTHER PUBLICATIONS

International Preliminary Report on Patentability dated Jun. 10, 2010.
Office Action dated Mar. 6, 2012 for corresponding Japanese patent application No. 2008-094405 with English translation.
Office Action dated Mar. 12, 2012 for corresponding Chinese patent application No. 200880011554.4 with English translation.
Extened European search report dated Jun. 11, 2012 for corresponding European patent application No. 08740142.8.
International Search Report.
Extended Euorpean search report for corresponding European patent application No. 08739559.6 dated Aug. 17, 2012.
Office Action for corresponding Chinese patent application No. 200880112937.0 dated Mar. 26, 2013 with English translation.
Office Action for corresponding Taiwanese patent application No. 097142308 dated May 8, 2013 with English translation.
Office Action for corresponding European patent application No. 08739559.6 dated Apr. 19, 2013.
Notification of Reason for Refusal for corresponding Japanese patent application No. 2012-139952 with English translation.
Office Action for corresponding Chinese patent application No. 200880113982.8 dated Jul. 3, 2013 with English translation.
Office Action dated Feb. 8, 2013 for corresponding Chinese patent application No. 200880113982.8 wit6h English translation.
Extended European Search Report for corresponding European patent application No. 08845025.9 dated Feb. 5, 2014.

* cited by examiner

RADIO WAVE ABSORBER IS DISPOSED
ON FLOOR FACE AND WALL FACE

WIRELESS COMMUNICATION IMPROVING SHEET, WIRELESS COMMUNICATION IC TAG, INFORMATION TRANSMITTING MEDIUM AND WIRELESS COMMUNICATION SYSTEM

TECHNICAL FIELD

The present invention relates to a wireless communication improving sheet that improves the communication distance when using a wireless communication IC tag, a wireless communication IC tag, information transmitting medium, and a wireless communication system.

BACKGROUND ART

Wireless communication techniques are applied not only to the field of information communication but also to the field of logistics management and the like, and an IC tag for wireless communication (hereinafter, simply referred to as an "IC tag") is widely known as a product that plays an important role in RFID (radio frequency identification) technology. Since an IC tag can be used in a wide range of applications for logistics management or low-cost information storage media, the IC tag is used in various environments.

The IC tag includes a chip that stores data such as an identification number and an antenna that is used for transmitting and receiving radio waves, and is significantly advantageous in that the IC tag can be realized as a small, thin, and light apparatus.

In order to sufficiently make use of such an advantage, it is preferable that there is no limitation on the position to which the IC tag is stuck, and that the IC tag is configured so as to be capable of performing communication regardless of the position or manner in which the IC tag is stuck.

However, the IC tag is designed to be used in the free space. In the case of using radio waves of a VHF band, a UHF band and a microwave band, since a general-purpose tag performs transmission/reception through a radio wave communication using a so-called dipole antenna, when a metal and the like exists in the vicinity of an antenna, communication properties of the antenna are degraded, so that a possible communication distance may be reduced.

In the case where a conductive material such as a metal exists in the vicinity of the antenna, when an electric current flows through the antenna, a reverse current is induced to the metal, so that input impedance of the antenna is significantly reduced by the induced current. Thus, impedance matching with an IC chip designed with respect to a free space is not achieved, so that a possible communication distance may be reduced.

In general, a dipole antenna, a monopole antenna and a loop antenna receive a radio wave with a specific frequency to generate a resonance current therein. When the resonance current flows through an IC chip, it is designed such that matching with chip impedance in the free space is achieved.

FIG. 25 is a cross-sectional view illustrating an electric field formed in the vicinity of a wireless IC tag 20 in the state in which the wireless IC tag 20 is arranged in the vicinity of a conductive member.

When a communication disturbing member 112 exists in the vicinity of an antenna element 111, an electric current 111 is generated from the other end portion 111b of the antenna element 111 to one end portion 111a thereof, and an electric current 112 is generated from one portion 112a of the communication disturbing member 112 to the other portion 12b thereof, so that a reverse current is generated in the antenna element 111 and the communication disturbing member 112.

Since an alternating current is applied by an IC 117, the generation state of the electric current in the direction illustrated in FIG. 25 and the generation state of the reverse current alternate. If a frequency becomes high, a state is reached, which is equivalent to a state as if an electric current I0 is generated between the one end portion 111a of the antenna element 111 and the one portion 112a of the communication disturbing member 112, and between the other end portion 111b of the antenna element 111 and the other portion 112b of the communication disturbing member 112. Thus, the one end portion 111a of the antenna element 111 is short-circuited from the one portion 112a of the communication disturbing member 112 in a high frequency manner, and the other end portion 111b of the antenna element 111 is short-circuited from the other portion 112b of the communication disturbing member 112 in a high frequency manner. When the above-described high-frequency short-circuit occurs, a closed circuit is formed by the antenna element 111 and the communication disturbing member 112, so that an electric current value is increased as compared with the case in which the communication disturbing member 112 does not exist in the vicinity of the antenna element 111. That is, as compared with the case in which the communication disturbing member 112 does not exist in the vicinity of the antenna element 111, impedance is reduced.

As described above, when a conductive material exists in the vicinity of the antenna or the chip, a reverse current relative to an electric current flowing through the antenna is induced to the surface of the conductive material, and a region of a high electric field and a region of a low electric field are connected to each other in a high frequency manner on the surface of the conductive material which faces the antenna, so that an electric path having a loop shape may be generated via the antenna and the conductive material. Since impedance is significantly reduced due to the generation of the electric path, matching with chip impedance is not achieved and an information signal cannot be transmitted. Thus, the possible communication distance may be reduced.

Further, as well as a metal, a paper, glass, resin, a liquid and the like may degrade the communication properties of the IC tag if they exist in the vicinity of the IC tag.

In the case of these materials, a resonance frequency of the antenna is changed according to a dielectric constant and permeability of these materials, and frequency shift occurs between a frequency of a radio wave used for a communication partner and the resonance frequency of the antenna, so that the possible communication distance may be reduced.

In addition, a product provided with the wireless IC tag is not limited to a single item, but may be provided in a plural number. Further, these may be aggregated, products having different sizes may coexist (the distance to a reader antenna is in a non-uniform state), or a case may occur in which a reading is necessary when a product is moving. When another RFID reader gate or metal material (radio wave reflector) exists adjacent to the product, a reading in a radio wave environment, which is different from an ideal environment such as a microwave darkroom, becomes necessary. In such a radio wave environment, radio interference may occur. Further, when wireless IC tags are aggregated or are in a state of movement, the probability that the wireless IC tags receive power necessary for starting or wireless communication is reduced, and a stable possible communication distance is difficult to ensure, so the possible communication distance may be reduced.

A wireless IC tag according to Japanese Unexamined Patent Application JP-A 2005-210676 includes an IC chip, a first antenna connected thereto, and a first spacer provided between the first antenna and a member provided with the IC chip. Further, the wireless IC tag includes a second antenna, and a second spacer provided between the first antenna and the second antenna.

With such a configuration, even when the IC tag is arranged in the vicinity of a metal, the communication distance can be increased.

According to JP-A 2005-210676, the second antenna serves as an auxiliary antenna, so that the communication distance is increased. However, since the auxiliary effect of the second antenna is actually small, the lengthening of the communication distance is not expected. Further, JP-A 2005-210676 discloses a wireless IC tag specially designed. In such a case, since the effect described therein is obtained using the special tag, there is no versatility such that communication improving effect can be exerted through the simple coupling of a commercialized wireless IC tag.

It is an object of the invention to provide a wireless communication improving sheet capable of improving a possible communication distance of an IC tag for wireless communication, a wireless communication IC tag, an information transmitting medium, and a wireless communication system.

It is another object of the invention to provide a sheet capable of improving wireless communication properties by simply tackinessly or adhesively applying a wireless IC tag.

The invention provides a wireless communication improving sheet for improving wireless communication properties of a wireless IC tag by arranging the wireless IC tag, comprising:

a first spacer having an arrangement surface for arranging the wireless IC tag without connecting the wireless IC tag with a wire;

an auxiliary antenna provided on a surface opposite to the arrangement surface of the first spacer; and a second spacer provided on an opposite side to the first spacer with the auxiliary antenna interposed therebetween, they being laminated one on top of another, the auxiliary antenna being formed with a hole or notch.

Further, in the invention, it is preferable that the auxiliary antenna includes a single or a plurality of conductor parts, and at least one of the conductor parts serves as a resonator which resonates with respect to an electromagnetic wave used for wireless communication.

Further, in the invention, it is preferable that the auxiliary antenna includes a plurality of conductor parts divided in a planar direction or a lamination direction, and at least one of the conductor parts serves as a resonator which resonates with respect to the electromagnetic wave used for wireless communication.

Further, in the invention, it is preferable that an adjusting unit formed with a hole or notch is provided for adjusting a resonance frequency of the wireless IC tag.

Further, in the invention, it is preferable that the adjusting unit is made of at least one material selected from the group consisting of a dielectric material and a magnetic material.

Further, in the invention, it is preferable that a wireless communication improving sheet further comprises a rear surface conductor layer provided on a side opposite to the auxiliary antenna of the second spacer.

Further, in the invention, it is preferable that the rear surface conductor layer is equal to or larger than the conductor part provided in the auxiliary antenna.

Further, in the invention, it is preferable that at least a part of the rear surface conductor layer protrudes in a resonance length direction of the conductor part provided in the auxiliary antenna.

Further, in the invention, it is preferable that the hole or notch is configured to face at least an IC chip or a reactance loading part provided in the wireless IC tag when the wireless IC tag is arranged.

Further, in the invention, it is preferable that the hole or notch is provided such that the auxiliary antenna resonates with respect to the electromagnetic wave used for wireless communication.

Further, in the invention, it is preferable that at least one of the first spacer and the second spacer is made of a foamed member.

Further, in the invention, it is preferable that a part or whole of an outer surface is coated with a dielectric material.

Further, in the invention, it is preferable that at least one of the arrangement surface and the surface opposite to the arrangement surface has adhesion or bonding properties.

Further, the invention provides a wireless communication IC tag obtained by arranging a wireless IC tag on the arrangement surface of the wireless communication improving sheet mentioned above, or by coupling an IC chip to the wireless communication improving sheet mentioned above.

Further, the invention provides a wireless communication IC tag obtained by combining a wireless communication IC tag whose coil antenna performing the wireless communication through electromagnetic induction improves communication properties by using a magnetic material, with the above-described wireless communication IC tag.

Further, in the wireless communication IC tag of the invention, a part or whole of an outer surface of the wireless IC tag is coated with a dielectric material.

Further, the invention provides an information transmitting medium comprising the wireless communication improving sheet or the wireless communication IC tag incorporated therein.

Further, the invention provides a wireless communication system using the wireless communication IC tag or the information transmitting medium.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
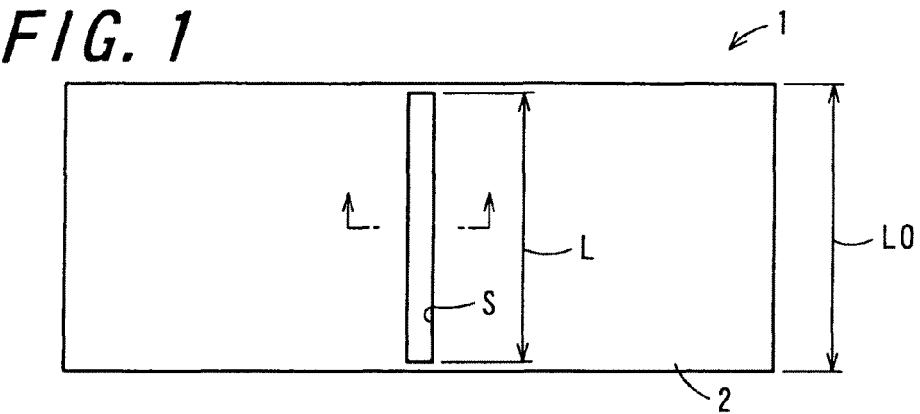
FIG. 1 is a plan view showing a sheet 1 according to a first embodiment of the invention.

Now referring to the drawings, preferred embodiments of the invention are described below.

The invention is directed to a wireless communication improving sheet (hereinafter, simply referred to as a "sheet") that improves the wireless communication properties of a wireless IC tag when the wireless IC tag is arranged thereon.

A sheet of the invention is obtained by laminating a first spacer having an arrangement surface for arranging the wireless IC tag without connecting the wireless IC tag with a wire, an auxiliary antenna provided on a surface opposite to the arrangement surface of the first spacer, and a second spacer provided on an opposite side to the first spacer with the auxiliary antenna interposed therebetween, and the auxiliary antenna is formed with a hole or notch.

The following is the background to the invention of the thus configured sheet by the inventors.

As proposed in conventional techniques, a wireless communication apparatus, such as a wireless tag, that performs communication via radio waves using an electric field antenna such as a dipole antenna, a monopole antenna, or a loop antenna is assumed to be used in free space, and thus, in the case where a member that disturbs communication (a conductive member such as metal, a dielectric member such as paper, glass, or liquid, a magnetic member) is present near the antenna, the influence of the communication disturbing member makes it difficult to perform wireless communication, and the possible communication distance is shortened.

Compared with this, for example, in the case of using a wireless IC tag provided with a patch antenna, a resonant plate resonating with a communication frequency and a conductor layer (ground layer) of a ground potential are provided. In particular, the influence of a communication disturbing member can be reduced by the existence of the ground layer, and a possible communication distance is sufficiently ensured. However, when manufacturing an IC tag of a patch antenna configuration, coupling of a patch antenna and an IC chip may be a problem. In general, in order to prevent the increase of a size, a punching process is performed with respect to the resonant plate of the patch antenna, and the IC chip is connected (DC coupling) to a punched place. This complicated manufacturing process causes the increase of cost.

First, a wireless IC tag provided with a dipole antenna, a monopole antenna and a loop antenna is combined with an auxiliary antenna of a patch antenna configuration having two conductor layers on a resonance layer and a ground layer, so that the influence of a communication disturbing member, such as a conductive member including a metal and the like, can be reduced by the ground layer, and resonance can be ensured by the resonance layer. Thus, it is considered to achieve the communication improvement of the wireless IC tag by using the resonance.

In this regard, after among the above-described configurations, a sheet obtained by laminating the first spacer, the auxiliary antenna, the second spacer and a conductor layer is manufactured, the auxiliary antenna, the second spacer and the conductor layer are employed as a patch antenna configuration, and a wireless IC tag is arranged on the sheet, as a result of measuring a possible communication distance of the wireless IC tag, it has been understood that improvement is not seen and the possible communication distance is reduced. It is considered that this is because electromagnetic coupling of the wireless IC tag and the patch antenna does not occur and the patch antenna does not fully operate. Further, in the case the auxiliary antenna (conductor) is merely arranged in the vicinity of the wireless IC tag, an electric current induced from the antenna element of the wireless IC tag flows through the surface of the auxiliary antenna, the relation of a differential mode is established, and the radiation characteristics of an antenna are disturbed. That is, the situation, in which a conductor such as a metal exists in the vicinity of the wireless IC tag, has occurred again.

In detail, since the electromagnetic coupling of the wireless IC tag and the patch antenna is not achieved if not using a path surrounding the outer periphery of the sheet (patch antenna), it is considered that the coupling cannot be actually achieved, and the patch antenna cannot effectively serve as the auxiliary antenna. In addition, an IC chip and a reactance loading part (a loop part of the antenna) are affected by the auxiliary antenna, so that the possible communication distance is reduced. That is, since a conductor plate (resonant plate) of the patch antenna exists in the vicinity of the IC chip and the reactance loading part, an induced current to the conductor plate is generated, so that impedance mismatching due to impedance reduction cannot be suppressed (refer to Comparative Example 1). Arrangement according to the invention represents that the IC chip is electromagnetically coupled to the sheet via a space or a medium in the state in which they are not DC-coupled to each other. Further, it is required that the IC chip and the sheet are arranged in appropriate positions in which the electromagnetic coupling can be achieved.

Based on such understandings, additional modifications are made such that the auxiliary antenna is formed with a hole (slot) or a notch (slit) and a hole or notch is further formed in a position corresponding to the IC chip or the reactance loading part, so that communication improvement of the wireless IC tag becomes possible. The hole or notch indicates that the conductor part of the conductor plate does not exist, and may be formed in a slit or slot shape. However, the invention is not limited thereto. In relation to the hole or notch, the shape thereof is not limited. That is, the hole or notch may have various shapes as long as the electromagnetic coupling can be achieved without at least the conductor part or by attenuating the influence of the conductor part. For example, the hole or notch may have a polygonal shape, a curve shape, a shape including a linear line and a curve, an irregular shape and the like. Further, as long as, by arranging gaps or mesh parts of a plurality of auxiliary antennas, punched parts of characters or signs, or high resistive layers, an electric resistance value of a position of the conductor plate, which corresponds to the IC chip or the reactance loading part is increased while suppressing the generation of an induced current resulting in the impedance reduction, the hole or notch may have various shapes.

It is important that the antenna of the wireless IC tag and the auxiliary antenna perform the electromagnetic coupling through the hole or notch existing in the position facing at least the IC chip or the reactance loading part of the wireless IC tag. Further, the electromagnetic coupling between the wireless IC tag and the auxiliary antenna is activated through the hole or notch, so that the wireless communication is performed through the auxiliary antenna, resulting in the improvement of a possible communication distance.

The hole or notch is formed in the position facing the IC chip or the loop part (the reactance loading part), so that they are less affected by the conductor plate and the possible communication distance can be improved.

As described above, when the hole or notch is formed in the auxiliary antenna, since an electric field is generated in the hole or notch along the longitudinal direction of the shape of the antenna according to a resonance operation of the antenna, the electromagnetic coupling between the antenna (and the IC chip) and the auxiliary antenna is activated therethrough.

In the case in which the auxiliary antenna is employed as the patch antenna configuration, when it is seen from the distribution of an electric field and a magnetic field in the patch antenna configuration, the strongest electric field is generated in the vicinity of an end portion through which a radio wave is transmitted and received and the lowest electric field is generated in the vicinity of the center thereof. At this time, the magnetic field and the electric field show the opposite behavior. The electric field generated in the hole or notch is supplied to a place at which the electric field is low, and a strong electric field in the vicinity of the center reaches the antenna or the IC chip of the wireless IC tag through the hole or notch, so that the electromagnetic coupling in a near field is activated. That is, since the electromagnetic coupling is possible through the IC chip of the wireless IC tag, and a space or a medium, places with a strong magnetic field are spatially created in the vicinity of the antenna or the IC chip, and exchange of energy or signals is activated according to the active flow of the electric field through the hole or notch, so that the wireless communication can be improved. The hole or notch formed in the auxiliary antenna is formed near the approximate center of the sheet. However, the hole or notch is not necessarily formed near the center. For example, the hole or notch may be formed at arbitrary points of the auxiliary antenna as long as the hole or notch can suppress the influence of the IC chip of the wireless IC tag.

The auxiliary antenna of the invention is different from a patch antenna in the following aspects. As well as the structural difference in that the hole or notch exists in the resonant plate, gateways or transmission paths of electromagnetic energy are superimposed therein through the hole or notch, so that it is possible to cope with an operation mechanism of delivery of the electromagnetic energy in the proximity, in addition to the existing antenna operation.

When the auxiliary antenna of the invention is combined with the wireless IC tag, at least a part of the auxiliary antenna resonates with a wireless communication frequency as a whole. When a wavelength of a radio wave with the wireless communication frequency is defined as $\lambda$, at least one of the long sides of the resonance layer of the auxiliary antenna has a dimension existing in the range of $\lambda/8$ to $3\lambda/4$.

Another feature of the invention lies in that communication of the wireless IC tag can be improved through simple attachment to the wireless IC tag. Commercialized wireless IC tags have chip impedance values, which are different from each other, due to respective designs thereof. The impedance values are different in the cases of a standing and an operational state, and vary depending on received energy amount under certain operation conditions. The feature of the wireless communication improving sheet of the invention lies in that impedance matching and improvement can be realized through simple attachment to the wireless IC tag having the unstable and changeable impedance. Through the auxiliary antenna and the hole or notch, an impedance adjustment function in an adjacent space is realized without connecting (DC coupling) the IC chip and the sheet with a wire. Consequently, the wireless communication improving effect can be exerted. Further, the impedance adjustment function is associated with a resonance frequency adjustment function. The impedance adjustment corresponds to a role as an adjustment unit of the hole or notch. In order to improve the impedance adjustment function, permeability in addition to a dielectric constant can be provided to the adjustment unit including the hole or notch.

The communication improvement mechanism of the wireless communication improving sheet of the invention can be summarized as follows. The hole or notch is formed in a position of the auxiliary antenna which faces the IC chip of the wireless IC tag, so that the wireless IC chip is less affected by an adjacent conductor. In addition, through the electromagnetic coupling in a space or a medium activated via the hole or notch, the IC chip is started by a power feeding method of feeding power through the hole or notch, so that information can be exchanged between the auxiliary antenna and the IC chip of the wireless IC tag. Finally, the impedance adjustment is carried out through the hole or notch, so that the resonance frequency is adjusted and the wireless communication properties are improved. A radio wave coming from a space resonates in the auxiliary antenna, enters from the gap between the auxiliary antenna and the conductor layer, reaches the IC chip of the wireless IC tag located adjacent to the auxiliary antenna by passing through the hole or notch of the auxiliary antenna, and allows the IC chip to start under the condition of impedance matching with the IC chip, thereby realizing communication. In the case of radio wave radiation, sequence opposite to the above sequence is applied.

According to the above-described results, even when a metal, a paper, glass, resin, a liquid and the like exist in the vicinity of the wireless IC tag, the wireless communication improving sheet of the invention is used, so that good and stable wireless communication properties can be obtained.

Hereafter, the sheet of the invention will be described in detail with reference to the accompanying drawings.

Figure 2:
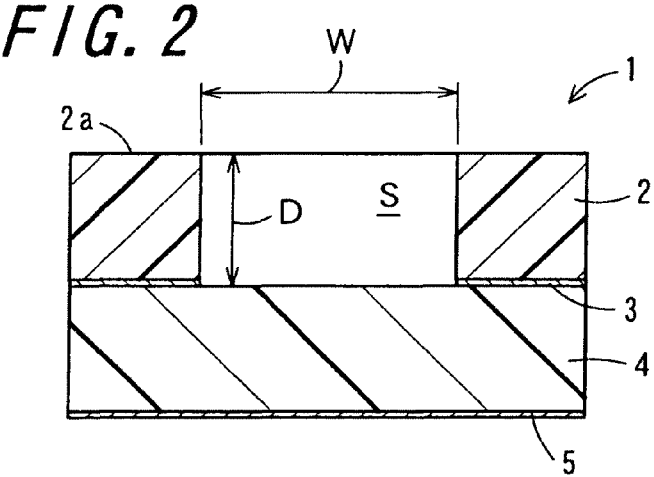
FIG. 2 is an enlarged cross-sectional view of the sheet 1.

FIG. 1 is a plan view illustrating the sheet 1 according to a first embodiment of the invention, and FIG. 2 is an enlarged cross-sectional view illustrating the sheet 1.

The sheet 1 includes a first spacer 2, an auxiliary antenna 3, a second spacer 4 and a conductor layer 5. Further, the first spacer 2 and the auxiliary antenna 3 are formed with a groove-shaped hole S.

The first spacer 2 has an arrangement surface 2a on which a wireless IC tag is arranged when the sheet is used, is provided such that a surface opposite to the arrangement surface 2a comes into surface contact with the auxiliary antenna 3, and is made of a dielectric layer which insulates between a dipole antenna of the wireless IC tag and the auxiliary antenna 3.

The auxiliary antenna 3 resonates with a communication frequency of the wireless IC tag to be electromagnetically coupled to the wireless IC tag, and also serves as a resonant antenna.

The second spacer 4 is provided on an opposite side to the first spacer with the auxiliary antenna 3 interposed therebetween, and is made of a dielectric layer which insulates between the auxiliary antenna 3 and the conductor layer 5.

The conductor layer 5 is provided on a side opposite side to the auxiliary antenna 3 with respect to the second spacer 4, and is a rear surface conductor layer serving as a ground layer.

The first spacer 2, the auxiliary antenna 3, the second spacer 4 and the conductor layer 5 have the same external dimension, and are laminated one on top of another in this order to form the sheet 1.

A planar shape of the sheet 1 when viewed in the lamination direction is, in many cases, rectangular, depending on a shape of the wireless IC tag arranged. Furthermore, the total thickness of the sheet 1 is approximately 0.5 to 10 mm.

In the first embodiment, the planar shape is defined as a rectangle, and the linear hole S is formed in the center portion in the long side direction of the rectangle while being in parallel to the short side direction. Based on the shape of the linear hole, the hole of the first embodiment will be referred to as an I type, and the sheet 1 will be referred to as an I type sheet in the following description. In FIG. 1, the hole S is formed at the approximate center of the sheet. However, the position of the hole S is not necessarily limited to the center portion. The hole S may be formed at appropriate positions according to the positions of an IC chip of the wireless IC tag, or a bonding part thereof and a reactance loading part.

The cross section of the hole S is as shown in the cross-sectional view in FIG. 2. That is, the hole S passes through the first spacer 2 and the auxiliary antenna 3 in the lamination direction, and as a result, the second spacer 4 forms the bottom of the groove. Therefore, the depth D of the hole S is the same as the total thickness of the first spacer 2 and the auxiliary antenna 3, and is, for example, 0.1 to 5 mm.

The hole S has a length L corresponding to 20% to 97% of the length L0 in the short side direction of the sheet 1. For example, the length L of the hole S is 6 mm to 116 mm.

The width W of the hole S is, for example, 1 to 120 mm, depending on the size or the like of the IC chip, a joint portion thereof, and the reactance loading part. When the hole S is arranged, the wireless IC tag and the auxiliary antenna 3 arranged are electromagnetically coupled via the hole S, and the auxiliary antenna 3 functions as a resonant antenna. Moreover, since the hole S is arranged directly below the wireless IC tag, the IC chip can be less affected by the auxiliary antenna 3 as a nearby conductor of the conductor part.

The first spacer 2 and the second spacer 4 insulate the wireless IC tag and the auxiliary antenna 3, respectively, insulate the auxiliary antenna 3 and the conductor layer 5, respectively, and further exhibit a wavelength shortening effect as dielectric layers to adjust the resonance frequency of the auxiliary antenna 3. A case may occur in which a region where an electric field is 0 is formed between the auxiliary antenna 3 and the rear surface conductor layer 5. In such a case, the auxiliary antenna 3 and the rear surface conductor layer 5 are electrically conducted to each other by forming vias in the region where the electric field is 0, so that an operation of the auxiliary antenna 3 is possible. Further, the sheet can be bent in the region where the electric field is 0, so that the sheet 1 and the wireless IC tag can be manufactured in a smaller size.

When the first spacer 2 and the second spacer 4 can ensure the position relationship of the wireless IC tag and the auxiliary antenna 3, or the conductor layer 5, it is preferred that they use a material which exhibits low loss of electromagnetic energy, that is, a material having a low dielectric tangent tan $\delta$ ($\in''/\in'$) or a magnetic tangent tan $\delta$ ($\mu''/\mu'$) in a communication frequency band. For example, the first spacer 2 and the second spacer 4 may operate in a space. However, in general, they use organic materials exemplified below.

As the organic material, a porous body of a polymer organic material such as rubber, a thermoplastic elastomer, various types of plastic, wood, and paper, may be used. Examples of the rubber include not only natural rubbers but also synthetic rubbers alone such as isoprene rubber, butadiene rubber, styrene-butadiene rubber, ethylene-propylene rubber, ethylene-propylene-diene rubber (EPDM rubber), ethylene-vinyl acetate-based rubber, butyl rubber, butyl halide rubber, chloroprene rubber, nitryl rubber, acrylic rubber, ethylene acrylic rubber, epichlorohydrin rubber, fluorine rubber, urethane rubber, silicone rubber, chlorinated polyethylene rubber, hydrogenated nitryl rubber (HNBR), and derivatives thereof, and rubbers obtained by modifying these rubbers through various types of modification treatment. These rubbers can be used each alone, or some of them can be used in a combination.

Examples of the thermoplastic elastomer include various thermoplastic elastomers such as chlorine-based elastomers (e.g., chlorinated polyethylene), ethylene copolymer-based elastomers, acrylic elastomers, ethylene acrylic copolymer-based elastomers, urethane-based elastomers, ester-based elastomers, silicone-based elastomers, styrene-based elastomers, amide-based elastomers, or olefin-based elastomers, and derivatives thereof.

Moreover, examples of the various types of plastic include thermoplastic resins and thermosetting resins such as polyethylene, polypropylene, AS resin, ABS resin, polystyrene, chlorine-based resin such as polyvinyl chloride or polyvinylidene chloride, polyvinyl acetate, ethylene-vinyl acetate copolymer, fluorine resin, silicone resin, acrylic resin, nylon, polycarbonate, polyethylene terephthalate, alkyd resin, unsaturated polyester, polysulfone, polyimide resin urethane-based resin, phenol resin, urea resin, and epoxy resin, and derivatives thereof, and further a copolymer and a recycled resin.

The above-described materials may be used without any treatment, or may be composed, or modified in use. The materials are preferably foamed. Examples of typical low density dielectric materials include resin foam such as polystyrene resin foam.

The dielectric material forming the first spacer 2 and the second spacer 4 preferably has a density of less than 1.0 g/cm$^3$, for example.

As the low density dielectric material as described above, it is possible to use one or a plurality of materials selected from the group consisting of porous organic materials and porous inorganic materials. Unfoamed materials may be used, or a combination of unfoamed materials and foamed materials may be employed. In addition, it is possible to use paper materials such as cardboard, wood, glass, glass fiber, soil-based materials and the like. Furthermore, base materials of the wireless IC tag or adhesive layers can be used as the materials for the spacers.

There is no limitation on means as to the foaming method, but foaming methods are classified into methods in which a foaming agent is added, methods in which thermally expanding fine particles are added, and the like. As the foaming agent, there are organic-based foaming agents and inorganic-based foaming agents.

Examples of the organic-based foaming agent added include, but are not limited to, dinitroso pentamethylene tetramine (DPT), azodicarbonamide (ADCA), p,p'-oxybis(benzenesulfonyl hydrazide) (OBSH), and hydrazodicarbonamide (HDCA).

Examples of the inorganic-based foaming agent added include, but are not limited to, sodium hydrogencarbonate, and the agent may be selected and added as appropriate according to the material.

Furthermore, examples of the thermally expanding fine particles added include thermally expanding fine particle pellets in the form of a microcapsule.

There is no particular limitation on the foaming ratio, but the foaming ratio has to be determined so that the change in the thickness of an absorber is small, the strength can be maintained, and the weight can be reduced. Thus, the foaming ratio is preferably approximately 2 to 30 times.

There is no particular limitation on the foaming structure, but the foaming structure is preferably determined so that the strength in the compression direction is high, for example, the material is foamed so as to be flat in the thickness direction.

Examples of the wood include a wood material such as plywood, lauan materials, particle board, or MDF. There is no substantial limitation on the material, and a plurality of materials may be used in combination.

Examples of the porous inorganic material include, but are not limited to, various ceramic materials, plasterboard, concrete, foam glass, pumice stone, asphalt, clay materials, and the like.

The dielectric materials of the first spacer 2, the second spacer 4, and the coating material have to convert received radio wave energy into transmission energy while suppressing loss as much as possible, and thus, it is necessary to select a material in which energy loss due to the material is as low as possible. Accordingly, the dielectric tangent tan δ ($\in$"/$\in$') for the frequency of electromagnetic waves used by the wireless IC tag for wireless communication is preferably 0.5 or less, and more preferably 0.2 or less.

The spacer material preferably has both a low density and a low dielectric tangent tan δ ($\in$"/$\in$'), but it is more important for the spacer material to exert a low dielectric tangent tan δ in a communication frequency band (the UHF band, etc.).

Furthermore, when the real part $\in$' of the complex relative permittivity is high, the sheet can be made thinner and smaller, and thus, $\in$' is preferably 1 to 10. Here, the sheet is deigned in view of various parameters, and thus, there is no limitation to this value.

The first spacer 2 and the second spacer 4 may be made of different dielectric materials, or the same dielectric material.

As materials used for the adjusting unit including the hole or notch, the materials used for the spacers can be used as they are. However, when increasing a dielectric constant for impedance adjustment, for example, it may be possible to combine a high dielectric constant material such as a carbon black, a carbon fiber, a graphite, a graphite fiber, a titanium oxide, a zinc oxide, a magnesium oxide, a metal oxide or a metal. When providing permeability, ferrite, Fe, Ni, a Fe-based alloy, an Fe-based oxide, a granulite composition, carbonyl iron, a magnetic metal, a magnetic oxide and the like may be combined therewith. When combining a metal, resistivity which does not permit electrical conduction is employed.

The auxiliary antenna 3 and the conductor layer 5 are made of conductive materials with conductivity.

The conductive material may include metal such as gold, platinum, silver, nickel, chrome, aluminum, copper zinc, lead, tungsten or iron, a resin mixture obtained by mixing powder of the metal or conductive carbon black with resin, a film of conductive resin and the like. The metal may be processed in a foil shape, a plate shape, a sheet shape, a film shape and the like. Further, it may be possible to employ a configuration in which a metal thin film layer having a thickness of, for example, 600 Å is formed on a synthetic resin film. It may be possible to employ a resultant obtained by transferring a metallic foil on a base material such as a film or a cloth. In addition, a metallic particle-based conductive ink (e.g., resistivity equal to or less than 10 Ω/square) may be coated on the first spacer 2 and the second spacer 4.

The size of the resonance layer of the auxiliary antenna 3 is determined according to wavelengths corresponding to radio waves of specific frequencies. However, it is preferred that the conductor layer 5 has a size which is at least equal to or larger than that of the resonance layer. This is for suppressing the influence due to the type of products to which the sheet is attached, as much as possible. Further, the conductor layer 5 may not be necessary, in a case in which the conductor layer 5 is attached to a material having electromagnetic shielding properties, for example, is attached only to a metal product, that is, a material having a function of a rear surface conductor layer.

The hole or notch S can be formed by a common forming method. The first spacer 2 may be subjected to mechanical process such as punching or cutting, or chemical process such as etching, thereby removing a predetermined portion that is to be the hole or notch from a plate member made of a dielectric material. Furthermore, in some cases, the dielectric material used can be shaped into a shape having the hole or notch in advance during the shaping process.

Also, the auxiliary antenna 3 may be subjected to mechanical process or chemical process, thereby removing a predetermined portion that is to be the hole or notch, as in the case of the first spacer 2. Furthermore, printing, evaporation, coating can be directly performed on the spacer in advance so that the spacer has the hole or notch.

Using this sort of method, the hole or notch may be formed in each of the first spacer 2 and the auxiliary antenna 3 may be laminated in advance on the first spacer 2 and then the hole or notch may be simultaneously formed in the first spacer 2 and the auxiliary antenna 3.

The hole or notch of the invention is essential in the auxiliary antenna 3, but is not absolutely necessary in the conductor layer 5. In a similar manner, the hole or notch may or may not be present in the first spacer 2 and the second spacer 4. It is required by the invention to provide the hole or notch in the closest conductor layer.

The hole or notch may have a slit shape (cutout shape) or a slot shape (hollow shape). The shape of the hole or notch is not limited thereto if electric resistance can be increased. Further, the dimension of the hole or notch may be resonant with respect to the frequencies of radio waves for wireless communication, or not.

The object of the adjusting unit including the hole or notch is to adjust the impedance of the IC chip of the wireless IC tag while adjusting the resonance frequency of the tag. According to the object, it is possible to change and control the impedance actively by providing permeability or a dielectric constant to the adjusting unit.

Figure 3:
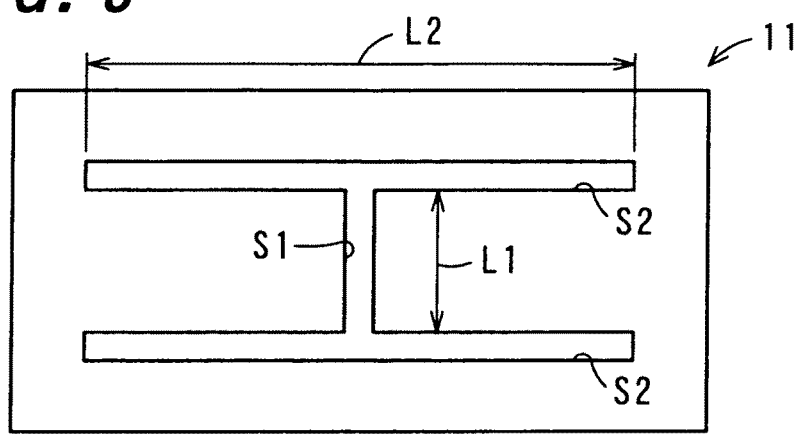
FIG. 3 is a plan view showing a sheet 11 according to a second embodiment of the invention.

FIG. 3 is a plan view illustrating a sheet 11 according to a second embodiment of the invention. Since materials constituting each layer and the like in the second embodiment are equal to those of the first embodiment except for the shape of the hole or notch in the first embodiment, only the groove shape will be described below.

In the second embodiment, similarly to the first embodiment, a planar shape is defined as a rectangle, and a linear hole S1 is formed in the center portion in the long side direction of the rectangle while being in parallel to the short side direction. Further, two linear holes S2 are spaced apart from each other by a predetermined interval in the short side direction while being in parallel to the long side direction. The hole S1 and the holes S2 are provided such that they cross each other in the center portion and the linear hole S1 does not protrude outwardly from the holes S2. Based on the shape of the above-described two holes S2 and the shape of the hole S1 provided in the center portion to couple the two holes S2 to each other, the hole S2 of the second embodiment will be referred to as an H type hole S2 and the sheet 11 will be referred to as an H type sheet in the following description.

Cross sections of the hole S1 and the holes S2 are equal to that of the cross-sectional view of FIG. 2 according to the first embodiment. That is, the hole S1 and the holes S2 pass through the first spacer 2 and the auxiliary antenna 3 in the lamination direction, so that the second spacer 4 forms the bottom of the groove. Further, depths and widths of the hole S1 and the holes S2 may be different from each other. However, herein, they are equal to each other. Similarly, the lengths, depths or widths of the two holes S2 may be different from each other. However, herein, they are equal to each other.

The depth D of the holes S2 is the same as the total thickness of the first spacer 2 and the auxiliary antenna 3, and is, for example, 0.1 to 5 mm. The width W of the hole S1 and the holes S2 is, for example, 1 to 50 mm, depending on the size or the like of the IC chip, a joint portion thereof, and the reactance loading part.

The length L1 of the hole S1 is, for example, 5 to 150 mm, and the length L2 of the holes S2 is, for example, 30 to 200 mm.

When the hole S1 and the holes S2 are arranged, the dipole antenna of the wireless IC tag and the auxiliary antenna 3 arranged are electromagnetically coupled via the hole S1 and the holes S2, and the auxiliary antenna 3 functions as a resonant antenna. Moreover, since the hole S1 is arranged directly below the wireless IC tag, and the holes S2 are arranged in the loop part (the reactance loading part) of the dipole antenna, the IC chip and the loop part (the reactance loading part) can be less affected by the auxiliary antenna 3 as a conductor.

Figure 4A:
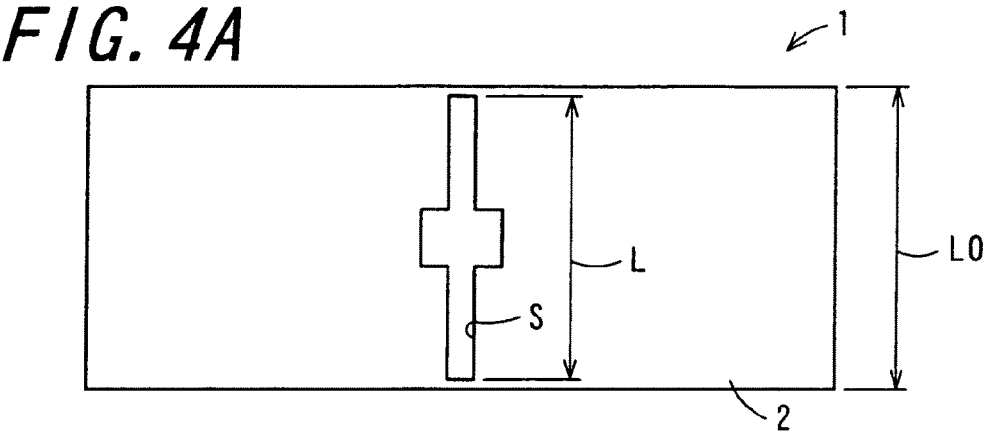
FIG. 4A is a plan view showing another embodiment of the invention.
Figure 4B:
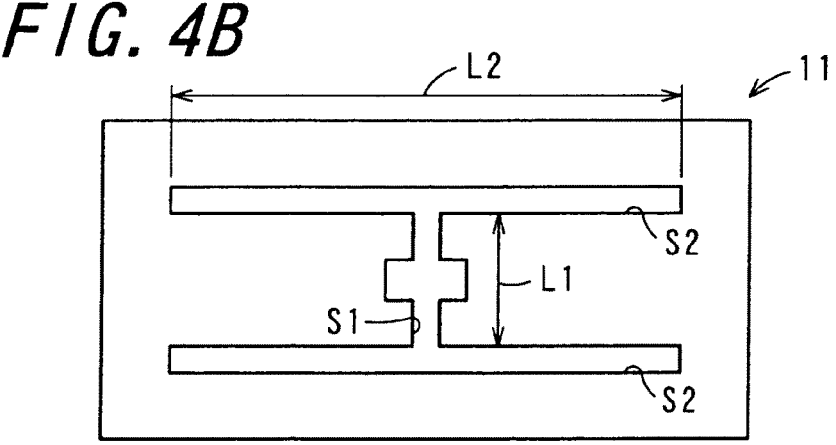
FIG. 4B is a plan view showing another embodiment of the invention.

FIGS. 4A and 4B are plan views illustrating other embodiments of the invention. FIG. 4A illustrates a third embodiment in which the hole S of the first embodiment is modified, and the width of the center portion of the hole S is allowed to be wider than other portions to reduce the influence to an IC chip. FIG. 4B illustrates a fourth embodiment in which the hole S1 of the second embodiment is modified, and the width of the center portion of the hole S1 is allowed to be wider than other portions to reduce the influence to an IC chip.

The shape or number of holes or notches is not limited to that of FIGS. 4A and 4B. For example, a plurality of holes may be formed, a combination thereof may be employed, or a notch portion may be formed to completely divide the auxiliary antenna. Further, the hole or notch may have arbitrary shapes such as linear shapes, rod shapes, circular shapes, arc shapes, curve shapes or irregular shapes. These may be vertically distributed.

In each sheet, preferably, the wireless IC tag is arranged on the arrangement surface 2a, and at least one of the arrangement surface 2a and the surface, which is opposite to the arrangement surface 2a, has adhesion or bonding properties so as to be attached to a target product. Thus, arrangement of the wireless IC tag or attachment to the target product can be easily performed. A mounting method to the target product is not limited thereto. For example, a method using a fixture, a method using a magnet, a fitting method, or a pressing down method using a matter having a tape form may be employed.

Figure 5:
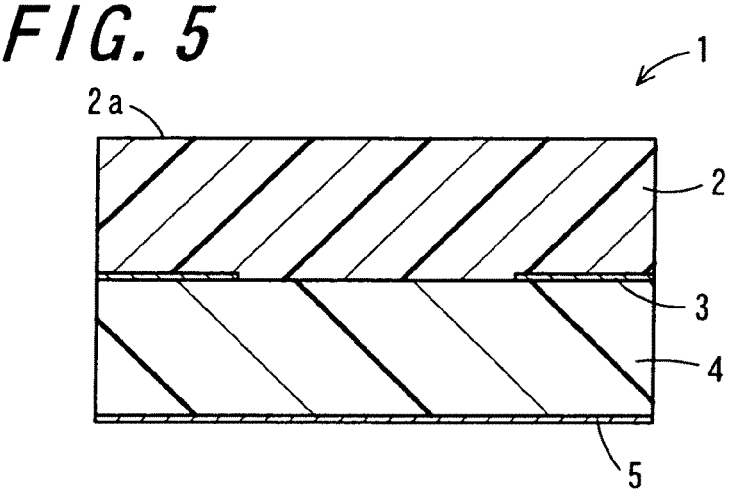
FIG. 5 is an enlarged cross-sectional view of the sheet 1 according to another embodiment of the invention.

FIG. 5 is an enlarged cross-sectional view illustrating the sheet 1 according to another embodiment of the invention. The forgoing embodiments describe the configuration in which the groove shaped hole S is formed through the first space 2 and the auxiliary antenna 3 and is defined by the second spacer 4 serving as the bottom. However, a configuration in which the first space 2 is not formed with a hole and only the auxiliary antenna 3 is formed with a hole, may be employed.

As a manufacturing method of the present embodiment, the first space 2 not formed with the hole may be attached to the auxiliary antenna 3 formed with the hole. Alternatively, after forming a hole in the first space 2 and the auxiliary antenna 3, the hole of the first space 2 may be filled.

Figure 6A:
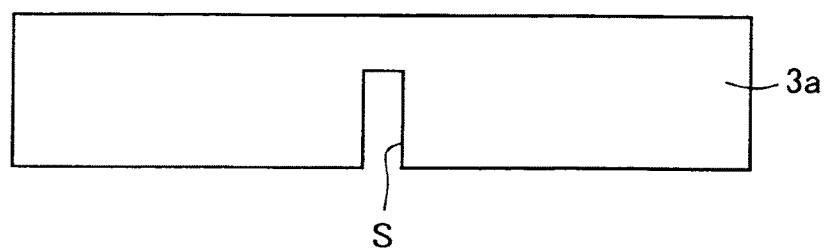
FIG. 6A is a plan view of another example of the auxiliary antenna.
Figure 6B:
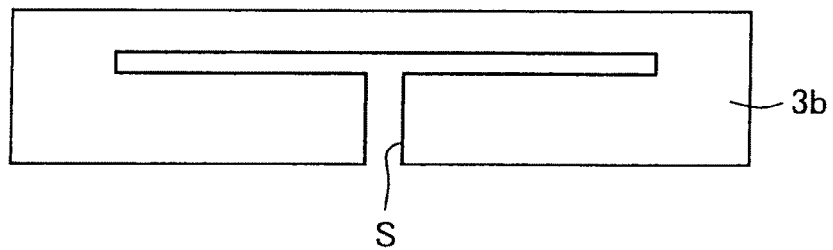
FIG. 6B is a plan view of another example of the auxiliary antenna.

In the foregoing embodiments, a groove-like hole was arranged through the auxiliary antenna 3, but a notch also may be arranged. FIGS. 6A and 6B show plan views of other examples of the auxiliary antenna. FIG. 6A shows a fifth embodiment and an auxiliary antenna 3a in which a notch S in the shape of a straight line is formed. FIG. 6B shows a sixth embodiment and an auxiliary antenna 3b in which a notch in the shape of a straight line parallel to the short side direction and a hole in the shape of a groove parallel to the long side direction intersect each other at the center portion, and the notch in the shape of a straight line does not project out of the hole.

Figure 7A:
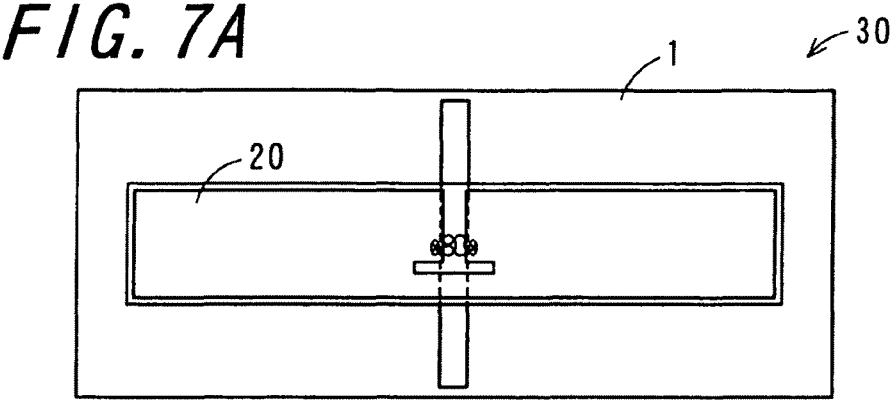
FIG. 7A is a plan view of a wireless communication IC tag 30 according to still another embodiment of the invention.
Figure 7B:
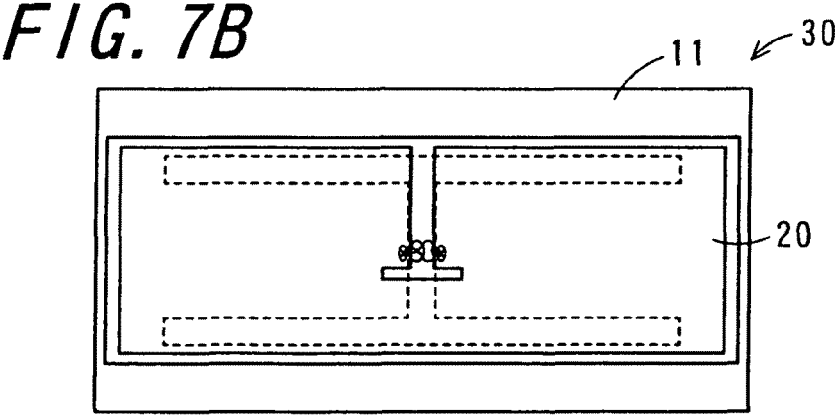
FIG. 7B is a plan view of a wireless communication IC tag 30 according to still another embodiment of the invention.

FIGS. 7A and 7B are plan views illustrating a wireless communication IC tag 30 according to still another embodiment of the invention. The wireless communication IC tag 30 of the present embodiment is directed to such a structure that the wireless IC tag 20 is arranged on the arrangement surface 2a of the sheet. FIG. 7A illustrates a seventh embodiment in which the wireless IC tag 20 is arranged on the arrangement surface 2a of the sheet 1 according to the first embodiment, and FIG. 7B illustrates an eighth embodiment in which the wireless IC tag 20 is arranged on the arrangement surface of the sheet 11 according to the second embodiment.

In the wireless communication IC tag 30, it is preferable that a part or whole of an outer surface thereof is coated with a dielectric material. The dielectric material may have a magnetic property. As dielectric materials for coating, for example, a hard cover and a soft cover for providing flexibility are considered. As the hard cover, the above-described various plastics, inorganic materials, woods and the like are considered. Combinations of resin and inorganic materials may be employed. As the soft cover, the above-described thermoplastic elastomers and various synthetic rubbers can be used. The use of materials capable of providing stiffness results in the hard cover and the use of materials capable of providing flexibility results in the soft cover. As materials, materials exemplified as the dielectric materials, other inorganic materials, paper-based materials, wood-based materials, soil-based materials, glass-based materials and ceramic-based materials can be used. It is optional whether to combine filler with these materials or perform a cross-lining treatment. Further, the materials may have adhesion or bonding properties. Foamed materials can be used. As the coating materials, materials exemplified as the materials for the first spacer or the second spacer can be used as they are. Combinations of polymers and glass fibers or other composite materials are frequently used. In particular, appropriate materials are selected in order to provide environment resistance, endurance, impact resistance or insulation properties, and then are subject to a coating process.

In the sheet of the invention, preferably, the size of the conductor layer 5 is equal to or larger than that of the resonance layer of the auxiliary antenna 3. More preferably, at least a part of the conductor layer 5 protrudes in the resonance length direction of the resonance layer of the auxiliary antenna 3.

Among the sizes of the resonance layer of the auxiliary antenna 3, the length of at least one side thereof is set to a resonance length which denotes a length at which a radio wave with a specific frequency used for wireless communication resonates. For example, in the sheet 1 as illustrated in FIG. 1, a dimension in the longitudinal direction of the auxiliary antenna 3 is set to the resonance length. Further, in the case of the I type sheet, the direction perpendicular to the extending direction of the hole S is set to the resonance length. In the case of the H type sheet, the direction perpendicular to the extending direction of the linear hole S1 parallel to the short side direction is set to the resonance length.

If the direction parallel to a side having the resonance length of the resonance layer of the auxiliary antenna 3, that is, the side in the longitudinal direction in the sheet 1 as illustrated in FIG. 1 is set to the resonance length direction, a part of the conductor layer 5 protrudes in the resonance length direction.

Figure 8:
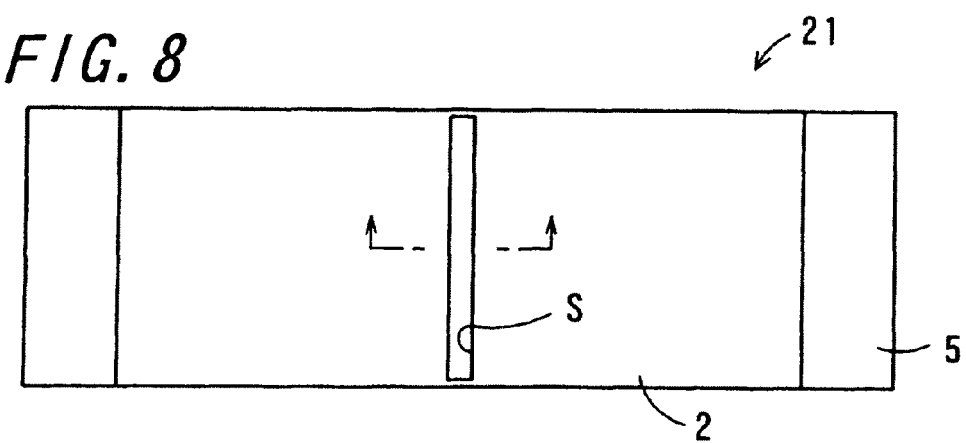
FIG. 8 is a plan view showing a sheet 21 according to still another embodiment of the invention.
Figure 9:
FIG. 9 is a front view showing the sheet 21.

FIG. 8 is a plan view illustrating a sheet 21 according to still another embodiment of the invention, and FIG. 9 is a front view illustrating the sheet 21.

When viewed in a plan view, in the sheet 21, the auxiliary antenna 3 and the second spacer 4 cannot be seen because the first spacer 2 provided at the uppermost layer overlaps them. However, the conductor layer 5 is visible because it protrudes in the longitudinal direction of the auxiliary antenna 3.

Further, in the present embodiment, the conductor layer 5 does not protrude in the direction perpendicular to the resonance length direction, that is, the lateral direction of the resonance layer of the auxiliary antenna 3, and the length of a side of the direction perpendicular to the resonance length direction of the conductor layer 5 is set to be equal to the length in the lateral direction of the resonance layer of the auxiliary antenna 3.

Since the conductor layer 5 serves as a ground layer, the conductor layer even have such a size that coupling with the resonance layer of the auxiliary antenna 3 is established and impedance can be adjusted. However, it is preferable that the second spacer 4 is provided to cover the entire surface of the sheet 21. Thus, preferably, the part of the conductor layer 5 protrudes in the resonance length direction so that the area of the conductor layer 5 is larger than that of the resonance layer of the auxiliary antenna 3. The part of the conductor layer 5 protruding in the resonance length direction can be coated with a dielectric material. In such a case, when the size relationship between the auxiliary antenna 3 and the conductor layer 5 can be maintained, the sizes of the first spacer 2, the second spacer 4 and the coating material are not limited, and therefore they can have appropriate sizes, respectively.

In addition, when the part of the conductor layer 5 protrudes in the resonance length direction, since the directionality of a radiated wave can be improved and thus the communication improving effect can be exerted, the part of the conductor layer 5 may protrude in only one side of the resonance length direction, for example. Further, it is not necessary for the part of the conductor layer 5 to protrude in the resonance length direction over the whole of the direction perpendicular to the resonance length direction. For example, the part of the conductor layer 5 may protrude in the resonance length direction only in a part of the direction perpendicular to the resonance length direction.

A protrusion length by which the part of the conductor layer 5 protrudes in the resonance length direction may vary depending on a specific frequency used for wireless communication. For example, the protrusion length may correspond to about 1.2 times to 2 times the resonance length of the resonance layer of the auxiliary antenna 3. If the resonance length is less than 1.2 times, the effect is not sufficiently obtained. If the resonance length exceeds 2 times, the effect is maintained but the entire size of the sheet may be increased.

Figure 10A:
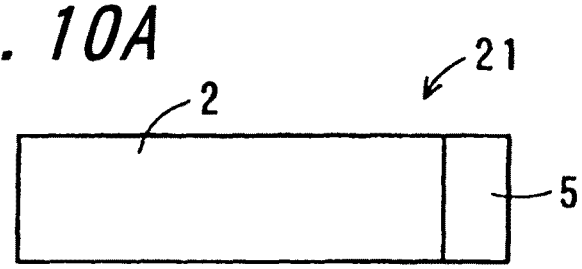
FIG. 10A is a plan view showing another embodiment of the sheet 21.
Figure 10B:
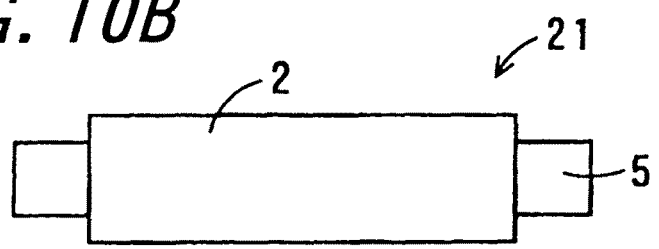
FIG. 10B is a plan view showing another embodiment of the sheet 21.
Figure 10C:
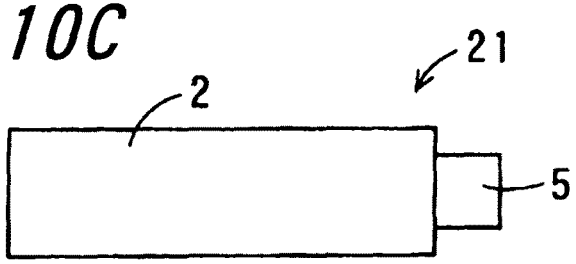
FIG. 10C is a plan view showing another embodiment of the sheet 21.

FIGS. 10A to 10C are plan views illustrating another embodiment of the sheet 21.

FIG. 10A is a plan view illustrating an embodiment in which a part protrudes in only one side of the resonance length direction, FIG. 10B is a plan view illustrating an embodiment in which a part only in the direction perpendicular to the resonance length direction protrudes in the resonance length direction, and FIG. 10C is a plan view illustrating an embodiment in which a part protrudes in only one side of the resonance length direction while protruding in the resonance length direction only in the direction perpendicular to the resonance length direction.

In the case of performing the wireless communication in the state in which the wireless IC tag is attached to the sheet, electromagnetic waves transmitted form the wireless IC tag are mainly emitted from an end surface in the resonance length direction. When the size of the conductor layer 5 is equal to or smaller than that of the resonance layer of the auxiliary antenna 3, electromagnetic waves emitted from the end surface are emitted in all directions about the end surface. However, when the part of the conductor layer 5 protrudes in the resonance length direction, electromagnetic waves emitted from the end surface are emitted only to a surface being in contact with the second spacer 4 of the conductor layer 5. Thus, the transmitted electromagnetic waves have directionality in the thickness direction of the sheet 21. In addition, electromagnetic waves emitted from both end surfaces in the resonance length direction to the thickness direction of the sheet 21 are coupled to each other above the sheet 21, that is, the wireless IC tag, so that transmission intensity is improved.

In the sheet 1 as illustrated in FIG. 1, the planar shape is defined as a rectangle. However, the invention is not limited thereto. For example, the planar shape may be defined as a square. When the planar shape is defined as a square, the resonance length direction denotes two directions perpendicular to each other while being in parallel to respective sides of the square. Thus, preferably, the conductor layer 5 does not protrude only in the longitudinal direction which is the resonance length direction as illustrated in FIG. 8, but protrudes in the two resonance length directions perpendicular to each other. As long as the planar shape of the sheet 1 of the invention has an antenna function, the shape thereof is not limited. For example, the sheet 1 may have a planar shape such as a polygonal shape, a circular shape, an oval shape or an irregular shape.

Figure 11A:
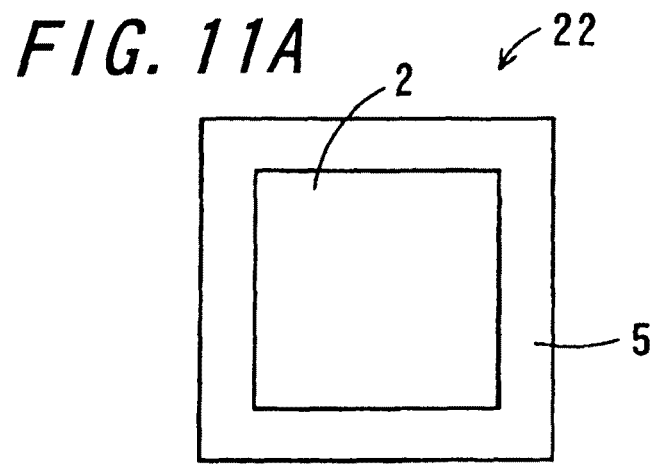
FIG. 11A is a plan view showing an embodiment of a sheet 22 having a square planar shape.
Figure 11B:
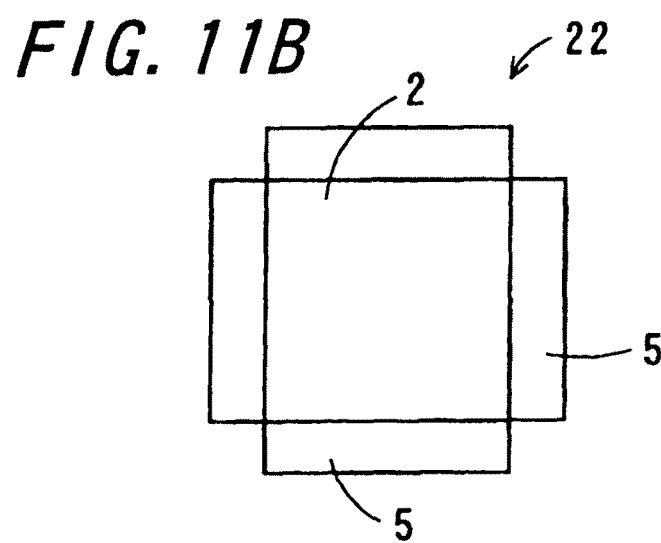
FIG. 11B is a plan view showing an embodiment of a sheet 22 having a square planar shape.

FIGS. 11A and 11B are plan views illustrating an embodiment of a sheet 22 when the planar shape is defined as a square.

FIG. 11A illustrates an embodiment in which the conductor layer 5 protrudes over the whole periphery of the resonance layer of the auxiliary antenna 3, and FIG. 11B illustrates an embodiment in which the conductor layer 5 protrudes in the two resonance length directions.

A wireless IC tag is arranged on the sheet 1, 11, 21, 22 of the invention, so that it is possible to obtain a wireless IC tag having superior wireless communication properties based on a radio method, similarly to the case of a free space, even if the sheet 1, 11, 21, 22 is attached to a communication disturbing member (e.g., a conductive material, a dielectric material or a magnetic material) which may degrade communication properties of the wireless IC tag. Further, the IC chip is directly mounted on the sheet 1, 11, 21, 22, so that the sheet 1, 11, 21, 22 serves as the wireless IC tag as it is. Such a wireless IC tag can perform the wireless communication, similarly to the case of a free space, even if it is attached to the communication disturbing member.

A communication frequency used for the invention is not particularly limited. However, the communication frequency includes a range of 300 MHz to 300 GHz, and a single or plural frequencies can be arbitrarily selected. The range of 300 MHz to 300 GHz includes a UHF band (300 MHz to 3 GHz), an SHF band (3 GHz to 30 GHz) and an EHF band (30 GHz to 300 GHz). Further, it is directed to a wireless communication improvement countermeasure for an antenna used for performing communication with the above frequencies through a radio method.

It is possible to use an information transmitting medium such as a slip, a verification, a card or a label which has the sheet or the wireless communication IC tag of the invention therein. These slips are currently utilized in physical distribution, logistics, distribution, inventory management, process management and the like, for a work instruction, a written request, a purchase order, a delivery slip, a tag, a slip or an advertising display. However, a matter in which a wireless IC tag for general purpose is embedded or bonded according to the related art, cannot be attached to the communication disturbing member. In the actual manufacturing field, there are many materials including the communication disturbing member. In the case of using the wireless communication improving sheet or the wireless communication IC tag of the invention, even when an IC tag, an advertising display, a slip, a verification, a card or a label is directly attached to products, intermediate products, parts and materials which include a communication disturbing member made of a metal material or a material having conductivity or a high dielectric constant, receptacles including these materials, transport equipment, pallets, cars, forklifts, containers, bags, sacks, cases, returnable containers, conductive boxes, meters, apparatuses, heavy equipment, furniture and fixtures, fixtures, machinery, instruments, members, fire extinguishers, gas cylinders, cylinders, tanks, vehicles, transport aircraft, on-board equipment, pipes, metal pipes and the like, wireless IC tag communication can be performed. Consequently, target products for physical distribution management, inventory management, distribution management, information management and the like can be expanded. Further, exportation and importation management can be easily performed by adaptively using an international frequency of an RFID frequency.

Figure 12:
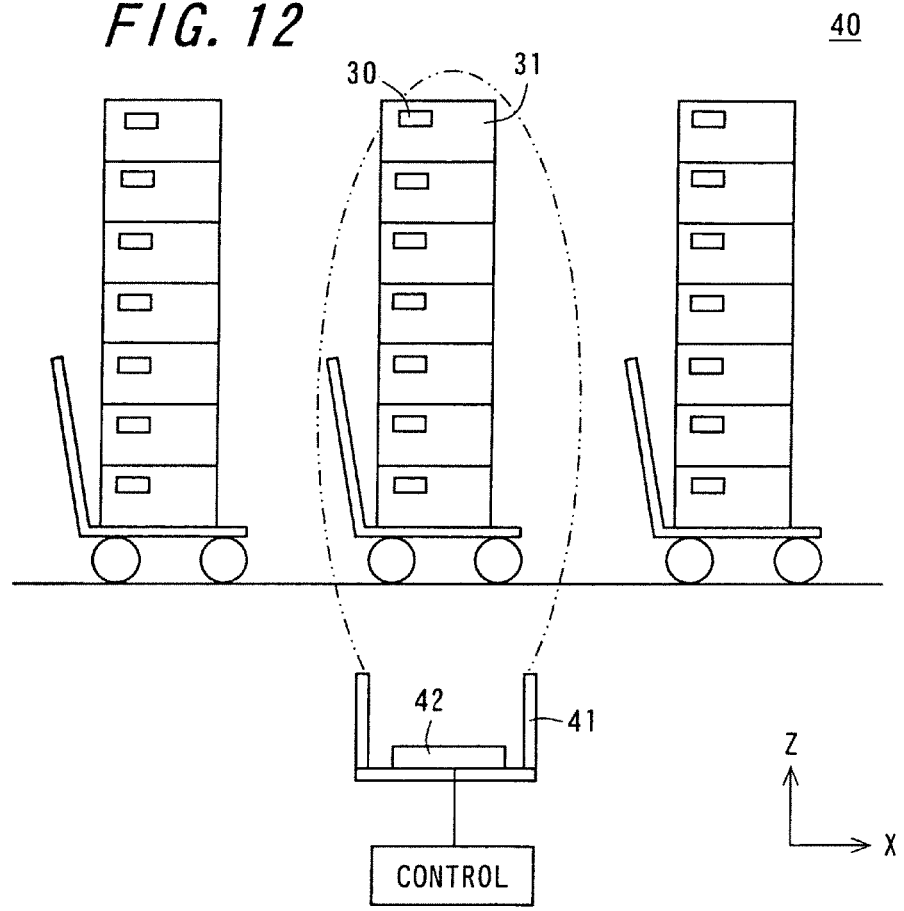
FIG. 12 is a plan view showing a wireless communication system 40 according to still another embodiment of the invention.

A wireless communication system is provided according to still another embodiment of the invention. The wireless communication system, for example, includes an RFID wireless communication system 40 as illustrated in FIG. 12, in which wireless IC tags 30 are attached to a plurality of metal receptacles 31, and the metal receptacles 31 simultaneously pass through an antenna gate unit 41 provided with a reader 42 so that reading or writing of information is performed. Further, it is possible to construct an RFID wireless communication system in which the wireless IC tags 30 are attached to a plurality of metal goods, these metal goods are sequentially transferred on a conveyor while maintaining a predetermined interval, and an antenna gate unit installed at an arbitrary position performs physical distribution management (management of entering and exiting of a vehicle) or traceability management with respect to the transferred metal goods. Information which can be transmitted through the wireless IC tags 30 may include a work instruction, a written request, a delivery slip, a purchase order and the like as well as a product ID, history information and special information. For example, such information is used as data for inventory management or cost management, so that it is possible to expect productivity improvement such as yield improvement or cost reduction.

Hereinafter, examples of the invention will be described.

EXAMPLES

After the sheets according to the respective embodiments of the above-described auxiliary antenna were manufactured, and wireless IC tags were attached thereto, a communication distance was measured.

Table 1 shows dimensions, materials and the like of Examples 1 to 7 and Comparative Examples 1 to 3. In Table 1, dimension "a" denotes the length of the long side of the sheet and dimension "b" denotes the length of the short side of the sheet. As to Examples 1 to 4 and 6 (embodiments 1, 3 and 5), a slit width denotes the width of the I type slit (notch). As Examples 5 and 7 (embodiments 4 and 2), a slit width denotes the width of the H type slit. Herein, the widths of the slit S1 and the slit S2 are equal to each other. Further, in Examples and Comparative Examples, a slit is not distinguished from a slot. Any one of the slit and the slot is used as a general term of a hole or notch. A slit and a slot each correspond to a notch and a hole, and vice versa.

An auxiliary antenna is constituted by a resonance layer composed of a conductor layer, and a second spacer, and may or may not have a conductive layer as a lower layer. A first spacer and a second spacer used for Examples are foamed resin, a real part ∈' of relative permittivity at a 950 MHz band is 1 to 2, and a dielectric tangent tan δ is smaller than 0.5.

TABLE 1

| | Embodiment | Dimension a (mm) | Dimension b (mm) | Slit Width (mm) | Slit Length (mm) | First spacer Material | First spacer Thickness (mm) | Second spacer Material | Second spacer Thickness (mm) | Existence of conductive layer | Total thickness (mm) | Communication distance (m) | Communication rate (%) |
|---|---|---|---|---|---|---|---|---|---|---|---|---|---|
| Example 1 | 1 | 110 | 46 | 4 | L = 43 | Foamed resin | 2 | Foamed resin | 2 | Presence | 4.2 | 5.2 | 116 |
| Example 2 | 3 | 110 | 46 | 4 | L = 43 | Foamed resin | 2 | Foamed resin | 2 | Presence | 4.2 | 5.1 | 113 |
| Example 3 | 1 | 110 | 46 | 4 | L = 43 | Foamed resin | 1 | Foamed resin | 2 | Presence | 3.2 | 5.0 | 111 |
| Example 4 | 3 | 110 | 46 | 4 | L = 43 | Foamed resin | 1 | Foamed resin | 2 | Presence | 3.2 | 3.5 | 78 |
| Example 5 | 4 | 95 | 50 | 4 | L = 47 | Foamed resin | 2 | Foamed resin | 2 | Absence | 4.2 | 2.4 | 53 |
| Example 6 | 5 | 95 | 30 | 6 | L = 27 | Foamed resin | 1 | Foamed resin | 2 | Presence | 3.2 | 4.4 | 98 |
| Example 7 | 2 | 95 | 40 | 6 | L1 = 14, L2 = 65 | Foamed resin | 1 | Foamed resin | 3 | Absence | 4.6 | 4.1 | 91 |
| Comparative Example 1 | — | 110 | 46 | — | — | Foamed resin | 2 | Foamed resin | 2 | Presence | 4.2 | 0.2 | 4 |
| Comparative Example 2 | — | | | | Spacer material: foamed polystyrene | | | | | | 3 | 0.2 | 4 |
| Comparative Example 3 | — | | | | Spacer material: foamed polystyrene | | | | | | 5.5 | 0.6 | 13 |

Comparative Example 1 is similar to Example 1 except that a slit is not formed. In Comparative Examples 2 and 3, a spacer with a single foamed polystyrene layer is provided, and an auxiliary antenna is not provided.

Figure 13:
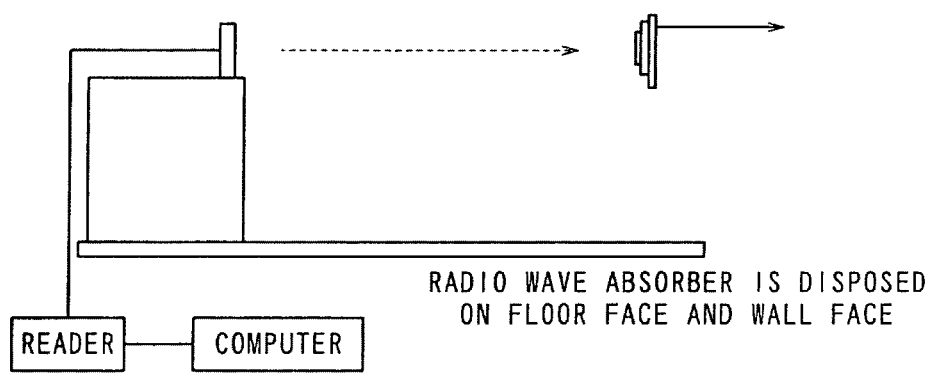
FIG. 13 is a schematic diagram illustrating a measurement method of a communication distance.

FIG. 13 is a schematic diagram illustrating a measurement method of a communication distance.

The wireless IC tag attached to the sheet was arranged on an SUS plate (210 mm×300 mm×0.5 mm (thickness)), the distance to the SUS plate was gradually increased from the possible communication distance, and the maximum distance which could be read by a reader antenna installed at a predetermined height, was defined as a communication distance.

The wireless IC tag used Wave Tag, manufactured by Omron Corporation, the reader antenna used TFU-AN11 (circularly polarized wave patch antenna), manufactured by Fujitsu Limited, and a reader used TFU-RW351 (transmission power: 28.5 dBm, used channel: random in 1 to 9 channels, and tag type: EPC C1G2), manufactured by Fujitsu Limited. When the wireless IC tag was arranged on the sheet, a part of an IC chip or a reactance loading part of the wireless IC tag was configured to face a slit part.

Based on the measured communication distance, a communication rate was calculated for evaluation. The communication rate was calculated by the communication distance/a tag reading communication distance (4.5 m) in the free space×100(%). The results are illustrated in Table 1.

According to Comparative Examples 1 to 3, all communication distances were short and the communication rate was 4% to 13%.

According to Examples 1 to 7, all communication rates significantly exceeded the communication rates of the Comparative Examples, and the communication improving effect was exerted.

According to Example 7, in the state in which the wireless IC tag had been attached to the wireless communication improving sheet, the wireless IC tag was attached to a metal can of φ140 mm along the curved surface thereof. Even in such a state, the communication distance was 3.5 m and the communication rate had a high value of 79%. It could be said that it was possible to cope with the curved shape of metal goods and to manage cylindrical metal products through RFID wireless communication.

Tables 2 and 3 show the results obtained by simulating shape effects when the wireless communication improving sheet 1 of the invention is used with respect to the wireless IC tag 20. Table 2 shows shape and material conditions, and Table 3 shows communication properties at feed matching S11 (S parameter) and 953 MHz, and the communication improvement ratio determined therefrom. Tables 2 and 3 show the case (patch antenna configuration), in which no hole or notch (expressed by a slit in Table) is formed, and relative comparison when using the wireless IC tag 20 in the free space. The first spacer and the second spacer of Table 2 use foamed resin equal to that of Table 1.

TABLE 2

| | Embodiment | Dimension a (mm) | Dimension b (mm) | Slit width (mm) | Slit length (mm) | First spacer Material | First spacer Thickness (mm) | Second spacer Material | Second spacer Thickness (mm) |
|---|---|---|---|---|---|---|---|---|---|
| Example 8 | 1 | 100 | 46 | 2 | L = 42 | Foamed resin | 1 | Foamed resin | 2 |
| Example 9 | 2 | 96 | 44 | 2 | L1 = 18, L2 = 76 | Foamed resin | 1 | Foamed resin | 2 |
| Comparative Example 4 | Patch without slit | 100 | 46 | — | — | Foamed resin | 1 | Foamed resin | 2 |

TABLE 2-continued

| Embodiment | | Dimension a (mm) | Dimension b (mm) | Slit width (mm) | Slit length (mm) | First spacer Material | Thickness (mm) | Second spacer Material | Thickness (mm) |
|---|---|---|---|---|---|---|---|---|---|
| Comparative Example 5 | Patch without slit | 96 | 44 | — | — | Foamed resin | 1 | Foamed resin | 2 |
| Comparative Example 6 | Free space | — | — | — | — | — | — | — | — |

TABLE 3

| | Communication properties (953 MHz) | | | | |
|---|---|---|---|---|---|
| | Feed matching S11 Peak frequency (GHz) | Feed matching S11 (dB) | Absolute gain Ga (dBi) | Working gain Gw (dBi) | Communication improvement ratio |
| Example 8 | 0.96 | −7.30 | 0.00 | −0.90 | 76% |
| Example 9 | 0.965 | −4.52 | −1.87 | −3.76 | 54% |
| Comparative Example 4 | 0.65 | −2.45 | −9.63 | −13.29 | 18% |
| Comparative Example 5 | 0.65 | −2.38 | −10.19 | −13.94 | 17% |
| Comparative Example 6 | 0.975 | −10.53 | 1.92 | 1.52 | 100% |

First, the wireless IC tag 20 used for the calculation is arranged substantially in the longitudinal direction (length 94 mm, width 16 mm), is a UHF band-compliant IC tag in which the impedance of the IC chip matches in the 950 MHz band in free space.

Figure 14:
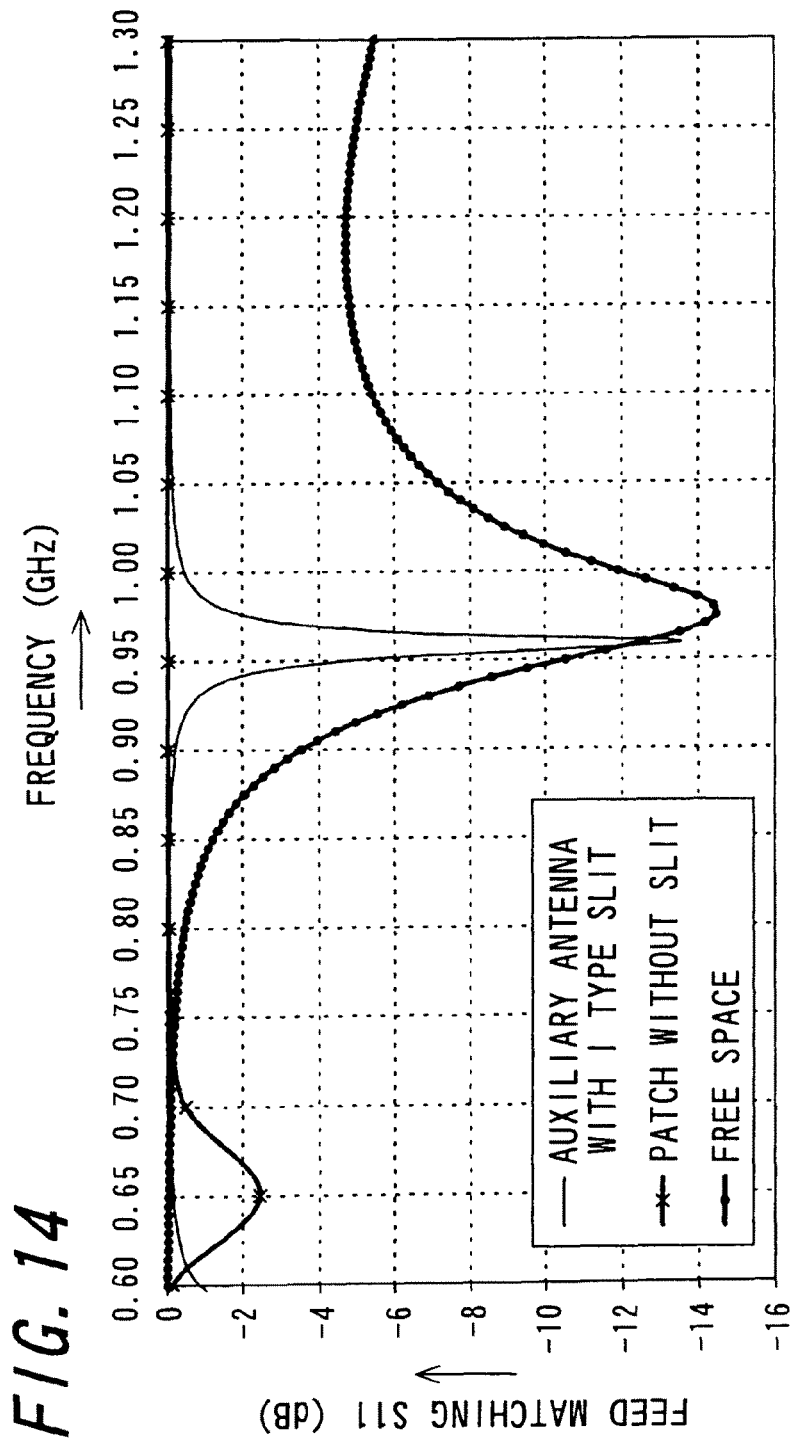
FIG. 14 is a view showing feed matching S11 in Example 8 and Comparative Examples 4 and 6.
Figure 15:
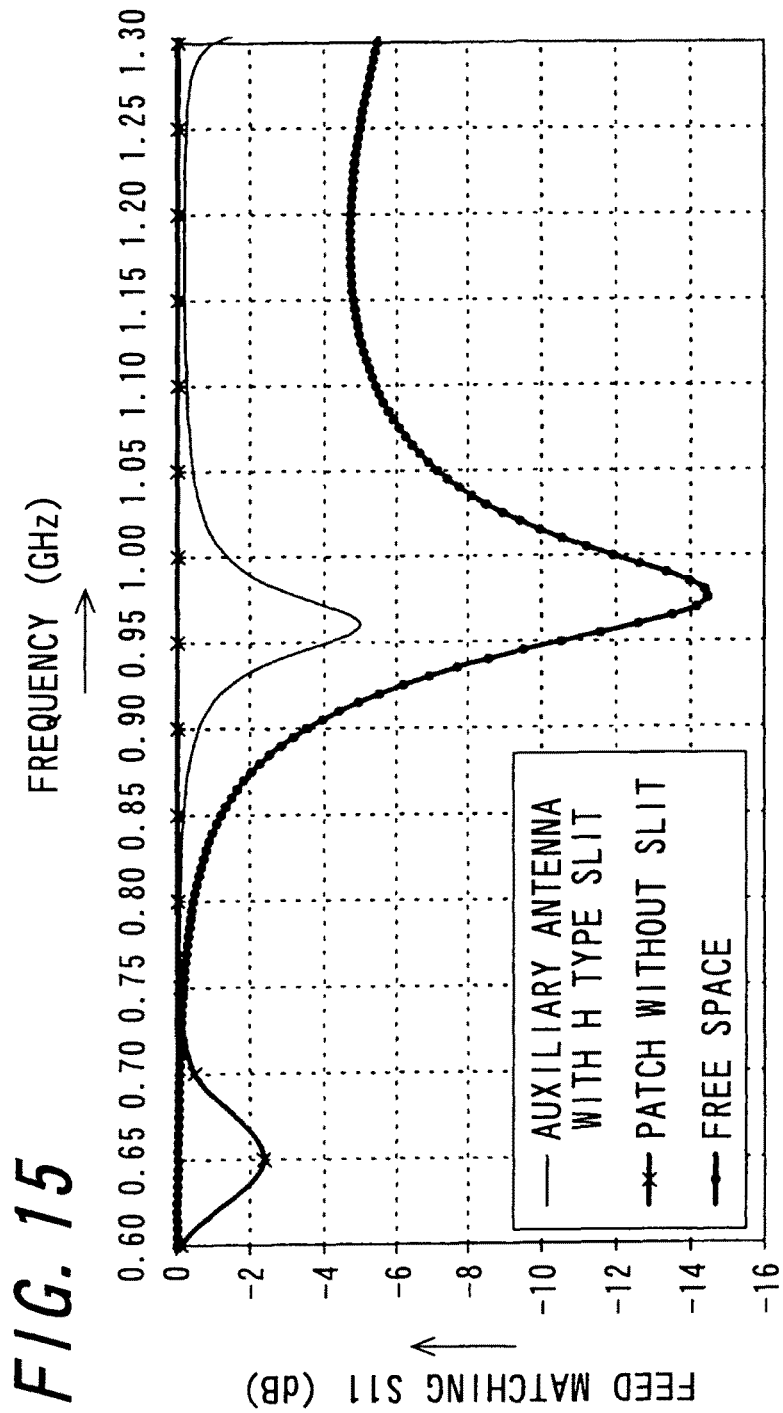
FIG. 15 is a view showing feed matching S11 in Example 9 and Comparative Examples 4 and 6.

Table 3 shows the peak frequency (GHz) of the feed matching S11, the feed matching S11 (dB) indicating the reflection properties of electromagnetic waves at 953 MHz, an absolute gain Ga (dB) indicating gain with respect to a reference antenna defined to have no directionality and no loss at the same frequency, a working gain Gw expressed by Expression (1) obtained in consideration of both matching loss and the absolute gain Ga, and the communication improvement ratio expressed by Expression (2) indicating a change in the communication distance of the wireless IC tag 20 with respect to the communication distance in free space. Furthermore, FIGS. 14, and 15 show the results for the feed matching S11. Here, the absolute gain Ga shows a measurement unit indicating the degree of a difference in the density of electrical power radiated from the antenna when the same electrical power is supplied.

$$Gw = 10\log\left(1 - 10^{\frac{S11}{10}}\right) + Ga \quad (1)$$

$$\text{Communication improvement ratio} = \sqrt{10^{\frac{Gw - Gwfree}{10}}} \quad (2)$$

wherein Gwfree indicates Gw value in free space

Comparative Example 6

In order to increase the communication improvement ratio, it is necessary to reduce the feed matching S11 maximally and to increase the absolute gain Ga by achieving impedance matching. As it can be seen from the results as illustrated in FIGS. 14 and 15, as compared with the case of using a patch antenna provided without slit, when using an auxiliary antenna provided with a slit, it can be understood through calculation that the feed matching S11 is significantly reduced to approach a value in the free space. That is, the thin and small sheet 1 is simply attached to achieve the impedance matching with the wireless IC tag 20 and to increase antenna radiation characteristics (absolute gain Ga). Although a band seen from the feed matching S11 is narrow, the communication improvement ratio competing with the free space is obtained. Through the examination of additional materials or configurations, it can be said that it is possible to provide the sheet 1 which covers a communication permission band and has a high communication improvement ratio.

Next, in relation to the sheet 21 in which the conductor layer 5 illustrated in FIG. 8 protruded in the resonance length direction, after a sheet was manufactured and a wireless IC tag was attached thereto, a possible communication distance and a possible communication direction were measured.

According to Example 10, dimension "a" is 105 mm and dimension "b" is 37 mm. In such a case, the conductor layer 5 has a length equal to that of the sheet. Further, the length in the direction "a" of the conductor layer 5 is set to 140 mm, the conductor layer 5 is configured to protrude from both sides in the direction "a", which indicates the resonance length direction, and then the sheet is evaluated. In the case in which the sheet has been attached to the SUS plate, after the SUS plate is left in the free space or is attached to an outer wall surface of a resin (polyethylene terephthalate) receptacle (PET bottle) containing water, the possible communication distance and the possible communication direction are measured. A measurement method is equal to the above method, but the possible communication distance and the possible communication direction are measured while changing the distance and direction between the reader antenna and the wireless IC tag.

Comparative Example 7 used only the wireless IC tag which was not attached to the sheet.

Figure 16A:
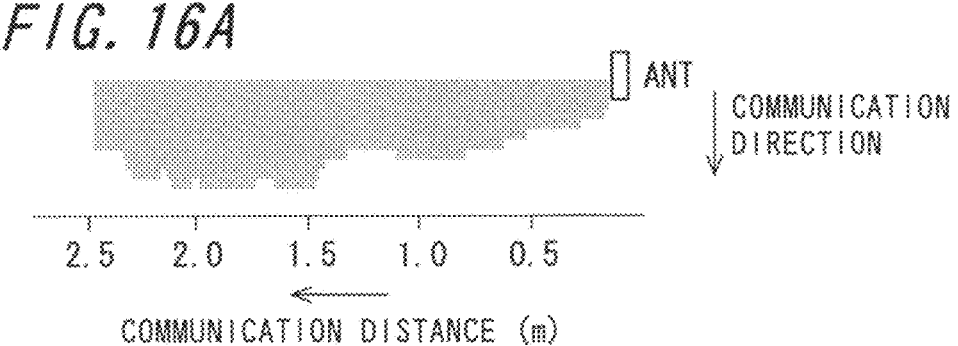
FIG. 16A is a diagram illustrating a measurement result of Example 10.
Figure 16B:
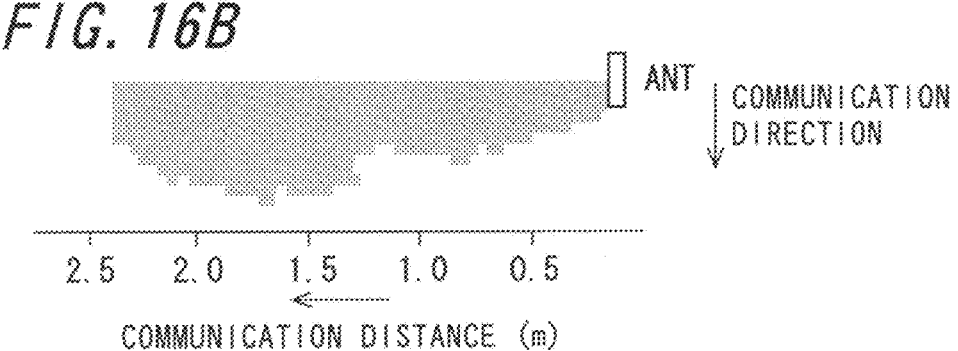
FIG. 16B is a diagram illustrating a measurement result of Example 10.
Figure 16C:
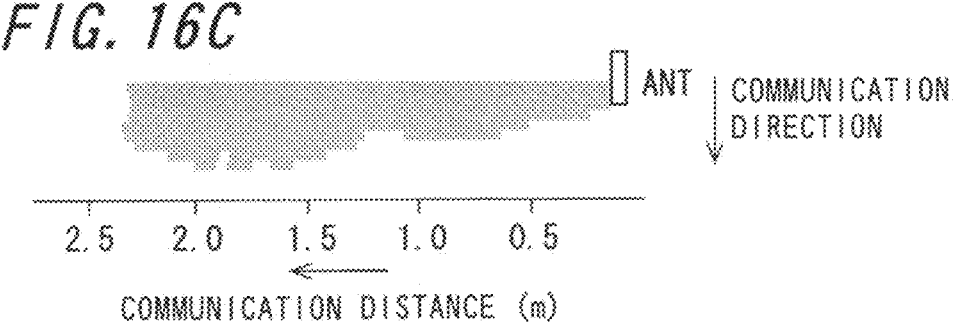
FIG. 16C is a diagram illustrating a measurement result of Example 10.
Figure 17A:
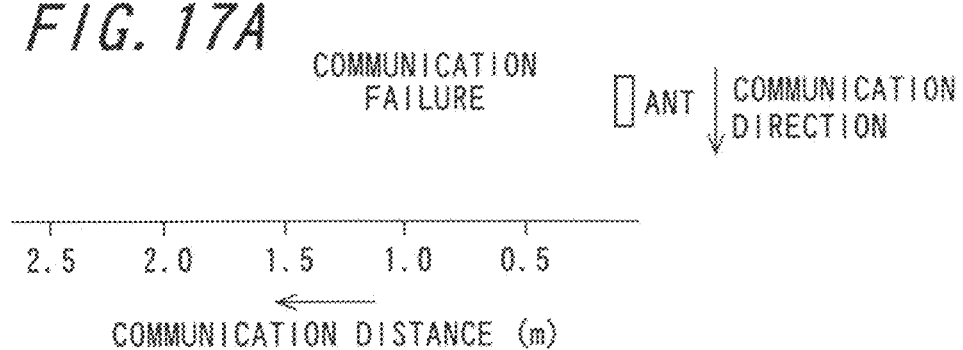
FIG. 17A is a diagram illustrating a measurement result of Comparative Example 7.
Figure 17B:
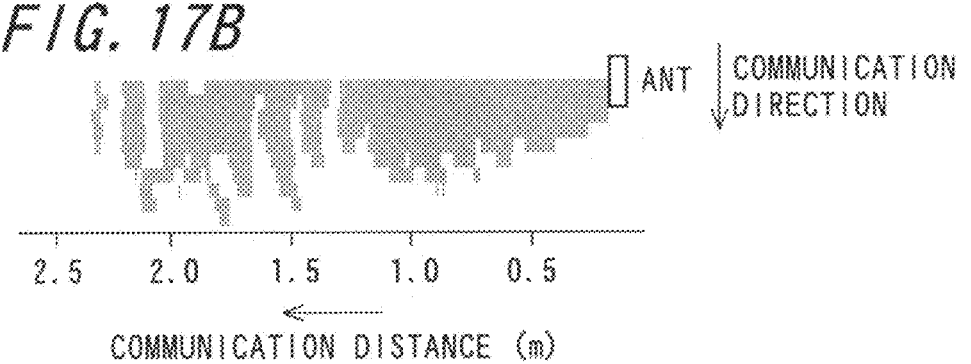
FIG. 17B is a diagram illustrating a measurement result of Comparative Example 7.
Figure 17C:
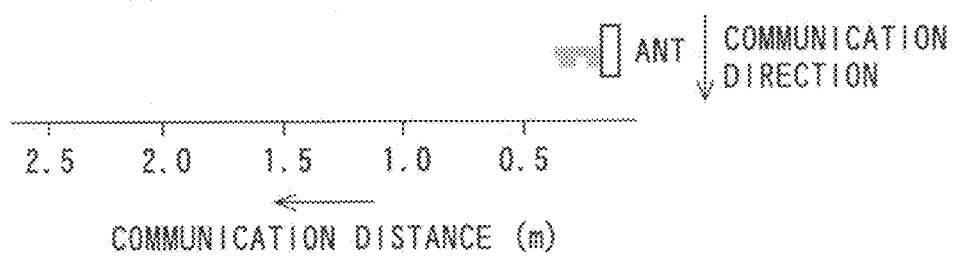
FIG. 17C is a diagram illustrating a measurement result of Comparative Example 7.

FIGS. 16A to 16C are diagrams illustrating the measurement results of Example 10. FIGS. 17A to 17C are diagrams illustrating measurement results of Comparative Example 7. FIG. 16A and FIG. 17A illustrate the measurement results when the wireless IC tag is attached to the SUS plate, FIG. 16B and FIG. 17B illustrate the measurement results in the normal space, and FIG. 16C and FIG. 17C illustrate the measurement results when the wireless IC tag is attached to the PET bottle containing water.

In FIGS. 16A to 16C and FIGS. 17A to 17C, the horizontal direction indicates the communication distance and the vertical direction indicates the communication direction. An upper right corner is the origin and indicates the position of the wireless IC tag. A black color range represents the position in which communication is possible. Thus, as the range is widened in the left direction, the possible communication distance is increased. As the range is widened in the down direction, the possible communication direction is expanded.

As it can be seen from the results of FIGS. 17A to 17C, in Comparative Example 7, when the wireless IC tag was attached to the SUS plate, communication failure occurred. In the normal space, the communication distance was reduced and the communication direction was narrowed. In addition, as a result of measurement in the normal space, a position where complete communication failure occurred, that is, a null position existed, and a position where independent communication was possible in a further distance, that is, a ghost read position existed. With regard to this, it is considered that when the wireless IC tag was measured, reflected waves were generated from a wall surface, a floor surface, a ceiling surface and the like, and interference occurred between direct waves used for direct communication and the reflected waves, so that a null was formed in a position where electromagnetic waves were destructive and a ghost read occurs in a position where electromagnetic waves were constructive. In each case, it is expected that reading errors frequently occur and communication reliability is reduced. When the wireless IC tag was attached to the PET bottle containing water, communication was slightly possible in an extremely short distance, but it could not be actually used.

Compared with this, according to Example 10, it was found that when the sheet had been attached to the SUS plate, in each case in which the SUS plate was left in the free space or was attached to the PET bottle, the communication distance was increased and the communication direction was expanded, so that communication was possible in a wide range. In addition, positions where communication is failed, did not occur and the ghost read did not occur, and the communication reliability was improved.

According to Example 10, after 9 (3×3) tags were arranged on a metal plate (90 cm×90 cm) at the same interval, a reading test was simultaneously performed with respect to the tags. By way of comparison, after 9 commercialized wireless IC tags are attached to a card board (90 cm×90 cm), reading performance is compared with that of Example 10. As a result of the test, a stable reading result could be obtained in the configuration of Example that used a large-sized metal plate where standing waves were generated by reflecting radio waves from a reader and unreadable areas might be easily generated by interference. Consequently, when the sheet of the invention is used, the IC tags can be read even when they are attached to the metal plate, and stable reading performance can be achieved, as compared with the commercialized IC tags, even when a plurality of tags are simultaneously read under the conditions in which radio interference may easily occur. In such a case, the reader has a power of 22.5 dBm.

As described above, the commercialized wireless IC tag for general purposes is mainly of a dipole antenna type. However, since this antenna has superior communication properties but has no directivity, that is, it can receive radio waves from all directions of 360° around an axis thereof, reflected waves are easily received and interference occurs at the reception points, so that reading failure easily occurs. Compared with this, when the sheet of the invention is used, since operation with the auxiliary antenna is performed even when the commercialized IC tag (dipole antenna configuration) is used, the reception of reflected waves can be suppressed, so that it is possible to provide a wireless IC tag having directivity which is most suitable for wireless communication, and to reduce the influence of unnecessary interference caused by the reflected waves. According to these effects, it is considered that even in the case of a region, a zone or an area such as a factory, a warehouse or transportation means in which special countermeasures against radio wave reflection or radio wave interference are not provided, stable and reliable reading and writing of a wireless IC tag can be realized, thereby contributing to the spread of an RFID tag system.

Further, in the case of using the sheet of the invention, it is basically designed that a wireless IC tag receives radio waves of the arrangement direction thereof. However, for example, in the case in which the sheet is not attached to a metal plate, it is possible to communicate with receive radio waves of the lateral direction thereof as well as radio waves of the direction of the conductor layer. Consequently, regardless of the directions, the configuration capable of performing the wireless communication can be realized, and, for example, communication which connects a plurality of IC tags to each other can be performed through the sheet of the invention.

Next, after a sheet adaptable to miniaturization was manufactured and a wireless IC tag was attached to the sheet, the communication improvement ratio was measured.

Examples 11 to 19 and Comparative Examples 8 to 10 were executed under the conditions of Table. 4. Table 4 also shows the measurement results of the communication improvement ratio.

TABLE 4

| | Spacer material | Spacer thickness (mm) | Dielectric layer material | Dielectric layer $\varepsilon'$ | Dielectric layer thickness (mm) | Dimension b mm | Dimension a mm | Slot shape | Slit width mm | Slit length mm | RFID communication distance Medium power free space (m) | RFID communication distance Medium power metal plate (m) | Communication improvement ratio (%) |
|---|---|---|---|---|---|---|---|---|---|---|---|---|---|
| Example 11 | PET | 0.1 mm | Foamed urethane | 1.6 | 2 | 20 | 100 | IO type | 6 | 18 | — | 0.45 | 20 |
| Example 12 | | | Foamed urethane | 1.6 | | | 90 | | | | — | 0.69 | 30 |
| Example 13 | | | Soft polyethylene | 2.2 | | | | | | | 1.00 | 1.26 | 63 |
| Example 14 | | | Vinyl chloride | 2.6 | | | | | 4 | | — | 0.85 | 43 |

TABLE 4-continued

| | Spacer material | Spacer thickness (mm) | Dielectric layer material | Dielectric layer ε' | Dielectric layer thickness (mm) | Dimension b mm | Dimension a mm | Slot shape | Slit width mm | Slit length mm | RFID communication distance Medium power free space (m) | RFID communication distance Medium power metal plate (m) | Communication improvement ratio (%) |
|---|---|---|---|---|---|---|---|---|---|---|---|---|---|
| Example 15 | | | Vinyl chloride | 2.6 | | | | | | | — | 0.52 | 43 |
| Example 16 | | | Polyester elastomer | 3.2 | | | | | | | — | 0.47 | 39 |
| Example 17 | | | Soft polyethylene | 2.2 | 4 | 15 | 80 | | 21 | 13 | — | 1.00 | 100 |
| Example 18 | | | Vinyl chloride | 2.6 | 4 | 15 | 75 | | 20 | 13 | — | 0.85 | 85 |
| Example 19 | | | | | 4 | 15 | 70 | | 35 | 13 | — | 0.50 | 50 |
| Comparative Example 8 | | | | | | | | | | | 2.00 | 0.00 | — |
| Comparative Example 9 | | | | | | | | | | | 1.20 | 0.00 | — |
| Comparative Example 10 | | | | | | | | | | | 1.00 | 0.00 | — |

Examples 11 and 12 used a wireless IC tag which was the same as that of Example 10. Examples 13 and 14 used a wireless IC tag in which the length of the wireless IC tag of Example 10 was cut to 80 mm. Examples 15 and 16 used a wireless IC tag in which the length of the wireless IC tag of Example 10 was cut to 70 mm. Examples 17 to 19 use a wireless IC tag which is different from that used for Example 10.

Comparative Examples 8 and 9 used a wireless IC tag in which the length of the wireless IC tag of Comparative Example 7 was cut to 80 mm. Comparative Example 10 used a wireless IC tag which is different from that used for Comparative Example 7. The commercialized wireless IC tag used for Examples 11 and 12 and Comparative Example 7 is a dumbbell type inlet (dimension 87.5 mm×20 mm) manufactured by DNP Co., Ltd, and the commercialized wireless IC tag used for Examples 17 to 19 and Comparative Example 10 is a linen tag (dimension 60 mm×15 mm) manufactured by Fujitsu Limited.

In addition, according to Example 10, Example 17 and Comparative Examples 7 to 10, frequency characteristics of minimum starting power of the IC tag were measured.

Figure 18:
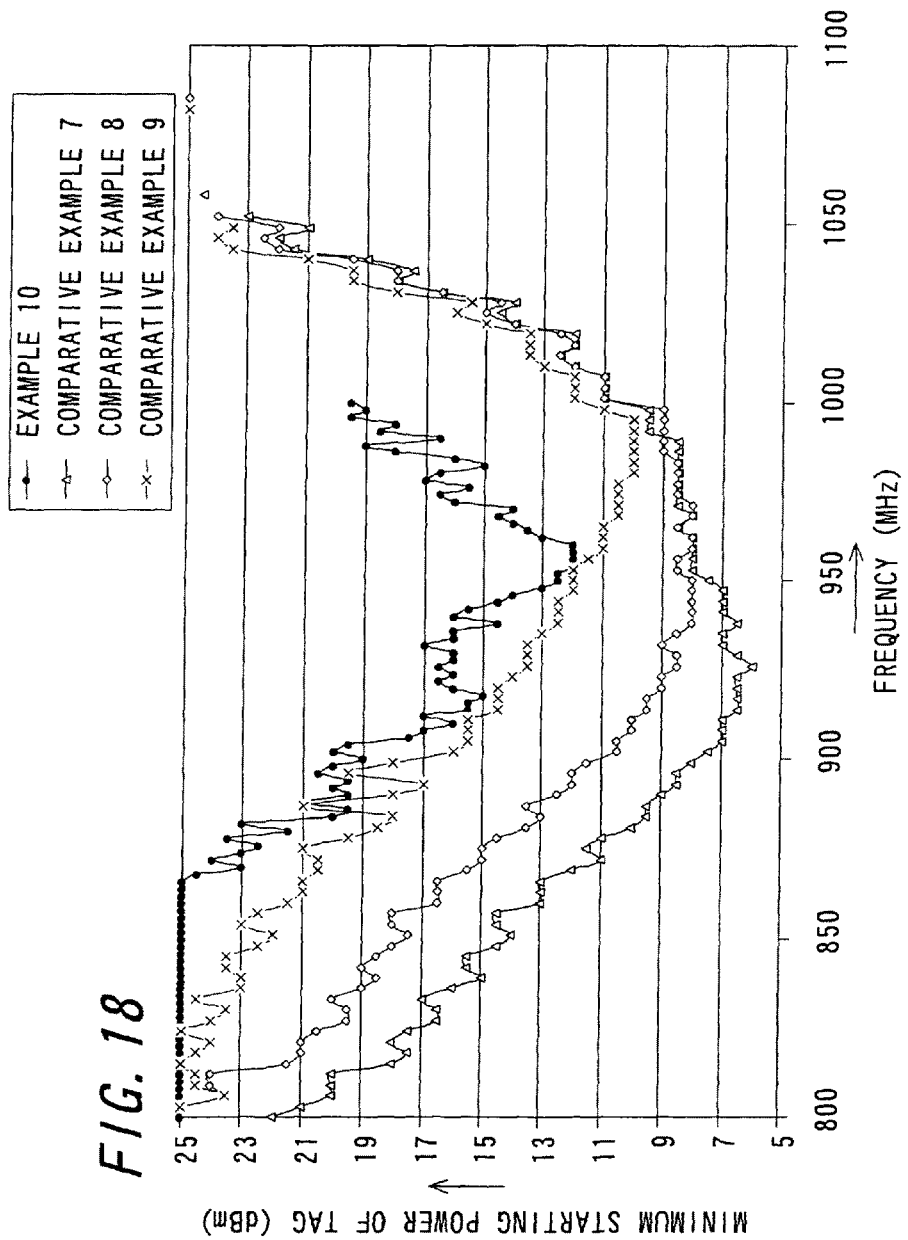
FIG. 18 is a graph illustrating frequency characteristics of a minimum starting power of IC tags in Example 10 and Comparative Examples 7 to 9.
Figure 19:
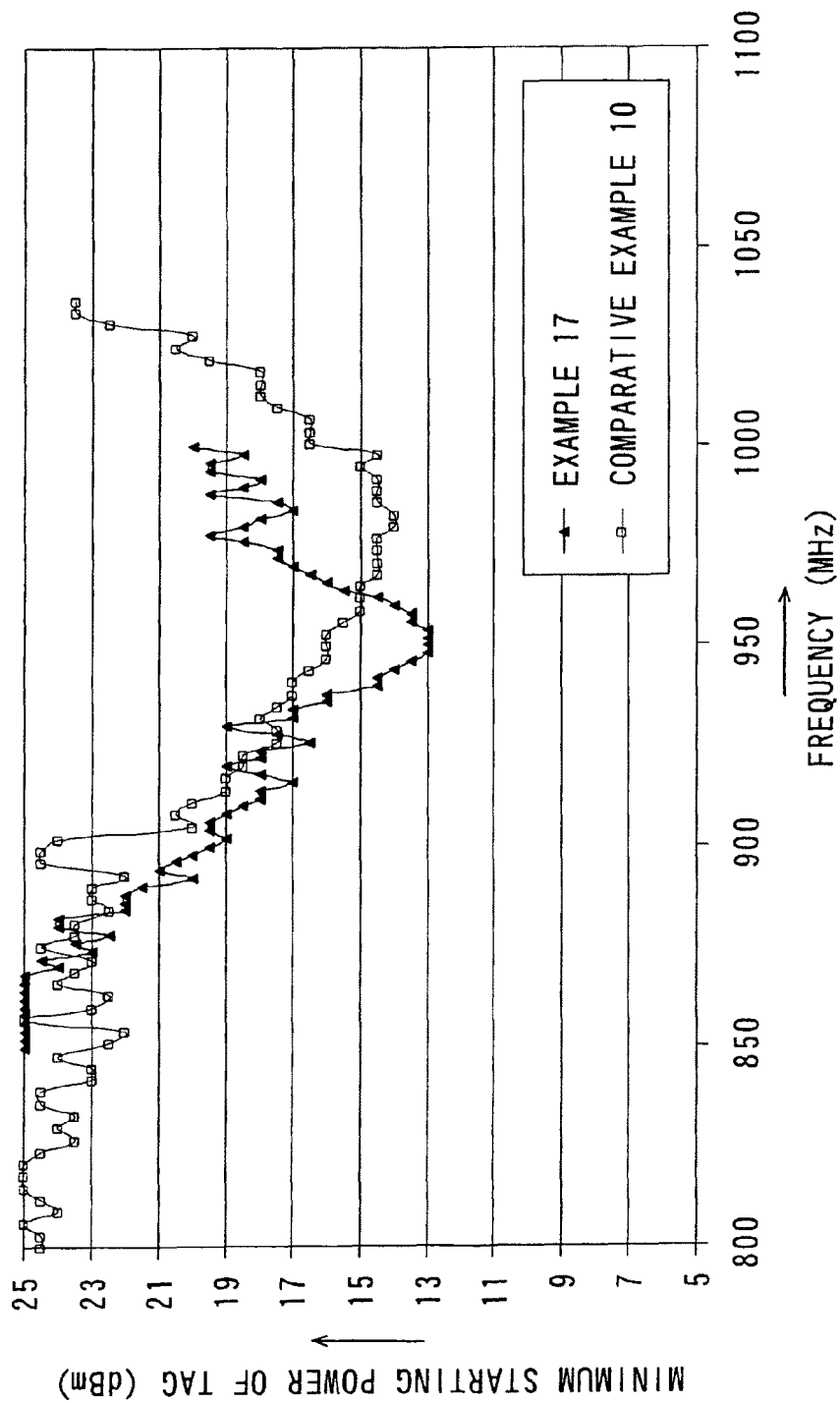
FIG. 19 is a graph illustrating frequency characteristics of a minimum starting power of IC tags in Example 17 and Comparative Example 10.

FIG. 18 is a graph illustrating the frequency characteristics of the minimum starting power of the IC tag in Example 10 and Comparative Examples 7 to 9. FIG. 19 is a graph illustrating the frequency characteristics of the minimum starting power of the IC tag in Example 17 and Comparative Example 10. The frequency characteristics were measured using an RFID tester manufactured by Peritex Corporation.

Referring to these graphs, as the minimum starting power is small, communication is easily performed and the communication distance is increased. According to Comparative Example 7 or 10, the commercialized wireless IC tags are used and complete communication failure occurs when they are attached to a metal plate. However, when the sheets of Examples 11 to 19 are used, the wireless communication is possible.

Comparative Examples 7 and 10 illustrated in FIGS. 18 and 19 show the communication distances of the commercialized wireless IC tags in the free space. These measurement results are compared with the wireless IC tag according to Example with reference to the same drawings, and minimum starting power values in communication frequencies are compared, so that actual wireless communication distances are relatively compared.

For example, when the minimum starting power value of the wireless IC tag of the invention is smaller than that of the commercialized wireless IC tag in the free space, it can be said that the wireless IC tag of the invention has a communication distance longer than that of the commercialized wireless IC tag in the free space.

Further, according to Comparative Examples 8 and 9, the IC tag of Comparative Example 7 was cut off for the purpose of miniaturization. Thus, the resonance frequency is changed and the communication distance is reduced. However, this is combined with the sheet of the invention and is adjusted with the UHF RFID approval frequency of Japan, so that communication properties are improved and the IC tag can be read even when the IC tag is attached to a metal plate.

In addition, Example 20 was executed as an example having wide band frequency characteristics, and the case of using only an IC tag the same as that attached in Example 20 was employed as Comparative Example 11. The wireless IC tag used in Comparative Example 11 is an ALN-9540 (94.8 mm×8.15 mm) manufactured by Alien Technology Corporation.

Example 20 employed a configuration in which a paper board (thickness: 1 mm) provided with an IC tag was attached to a sheet. The sheet has an external appearance of (100 mm×200 mm), a first spacer is foamed polyethylene having a thickness of 1 mm and a second spacer is foamed polyethylene having a thickness of 4 mm. An auxiliary antenna has an external appearance of (100 mm×110 mm), and is provided with an I type slot having width of 10 mm and length of 65 mm. Further, the rear surface conductor layer 5 is laminated with a size of 100 mm×200 mm.

The paper board provided with the IC tag, for example, is an information transmitting medium such as an instruction, and is attached for use to a receptacle, such as a conductive returnable container, a container or a conductive pallet.

In the state in which the sheet and the paper board provided with the IC tag were overlaid on each other, the communication improvement ratio (free space and attachment to the SUS plate) and the frequency characteristics (free space and attachment to the SUS plate) of the minimum starting power of the IC tag according to Example 20 were measured. As Comparative Example 11, the above measurement items were measured using only the IC tag of the paper board provided with the IC tag.

The communication improvement ratio was measured on the basis of the communication distance in the free space according to Comparative Example 11. In each condition of the free space and the attachment to the SUS plate according to Example 20, the communication improvement ratio was 193%. In the condition in which the commercialized IC tag was attached to the SUS plate according to Comparative Example 11, communication failure occurred.

Figure 20:
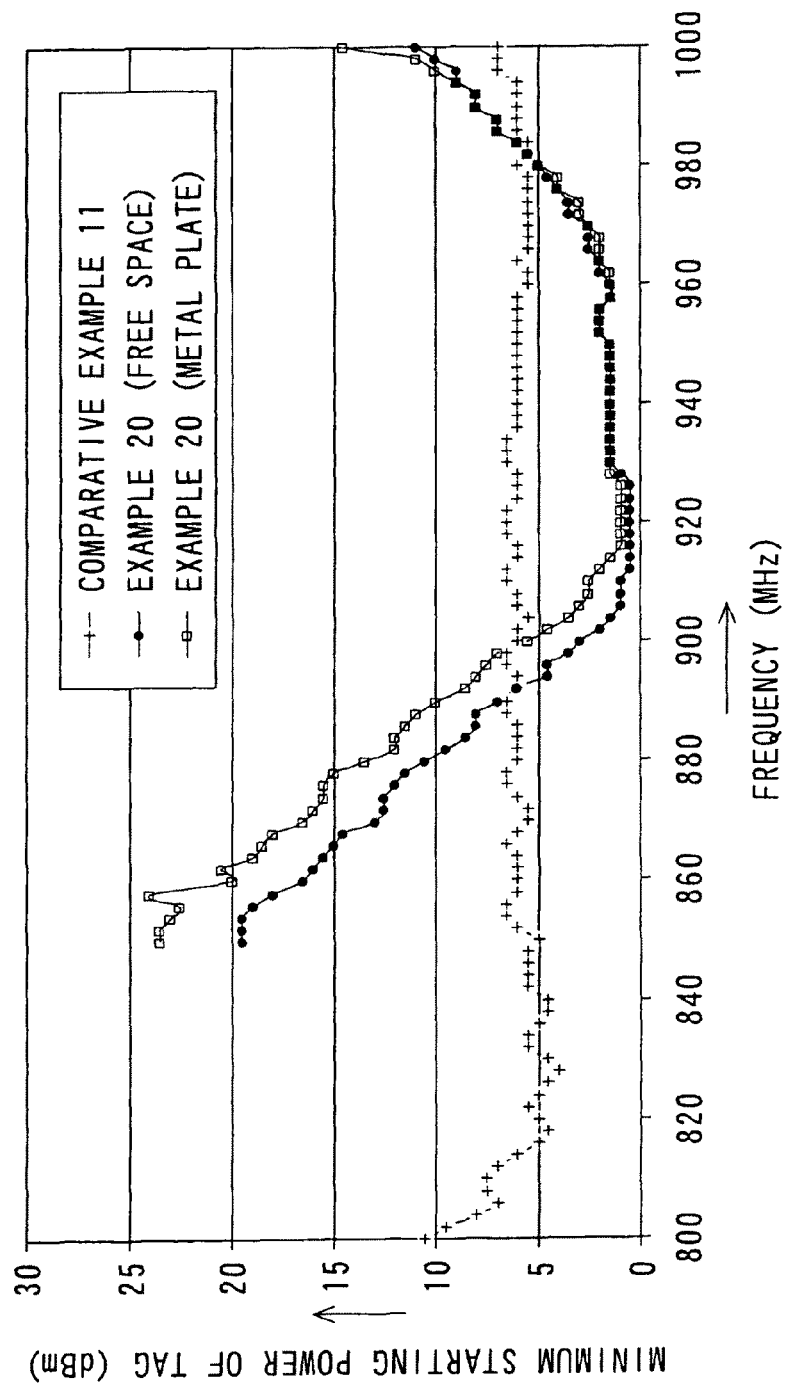
FIG. 20 is a graph illustrating frequency characteristics of minimum starting power of IC tags in Example 20 and Comparative Example 11.

FIG. 20 is a graph illustrating frequency characteristics of minimum starting power of IC tags according to Example 20 and Comparative Example 11.

As illustrated in FIG. 20, the frequency characteristics (expressed by Example 20 (free space)) in the free space and the frequency characteristics under the SUS plate attachment condition (expressed by Example 20 (metal plate)) according to Example 20 cover a narrow band of 900 MHz to 980 MHz and a wide band as compared with Comparative Example 11. In addition, the minimum starting power of the IC tag is lower than that of Comparative Example 11 by about 5 dBm. If this is converted into the communication distance, the communication distance according to Example 20 corresponds to about 1.8 times the communication distance according to Comparative Example 11. The measurement results correspond to the results of low power (16.5 dBm), and Comparative Example 11 shows that the communication distance in high power (28.5 dBm) is about 5 m. When these values are compared relative to each other, Example 20 shows that the communication distance is about 9 m. In Southeast Asia, USA and Japan, there does not exist a tag which is compatible with RFID frequencies of a UHF band and has a communication distance corresponding to about twice the communication distance of the commercialized wireless IC tag. In addition, since the IC tag of the invention can be used even if it is attached to a metal surface or left in the free space, the IC tag can be used for RFID management for international physical distribution.

Next, communication properties when the sheet of Example 20 is attached to a metal plate and when the commercialized wireless IC tag of Comparative Example 11 is left in the free space are compared with each other through simulation. In addition, as Comparative Example 12, in the state in which the sheet is removed from Example 20, that is, the commercialized wireless IC tag is spaced apart from the metal plate by 5 mm, the communication properties are evaluated. Table 5 shows the evaluation results.

Figure 21:
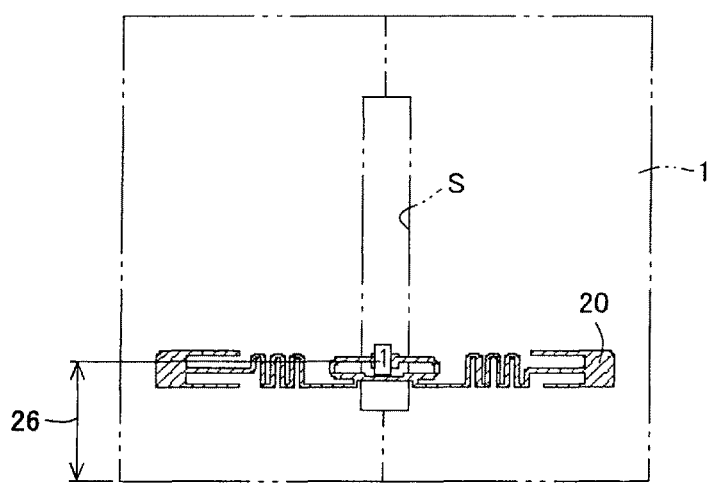
FIG. 21 is a plan view showing a state where the wireless IC tag 20 is arranged on the sheet 1 of Example 20.

Further, Example 20 is provided with a wireless IC tag which is the same as that of Comparative Example 11. FIG. 21 illustrates the arrangement state at that time. The IC chip of the wireless IC tag 20 is arranged on a slot S, and the wireless IC tag 20 is attached to the sheet 1 such that the longitudinal direction of the antenna of the wireless IC tag 20 is perpendicular to the longitudinal direction of the slot S. The IC chip is located at a position of 26 mm from the lower side of the sheet 1.

TABLE 5

| | Feed matching S11 Peak frequency (GHz) | Communication properties (953 MHz) | | |
| --- | --- | --- | --- | --- |
| | | Feed matching S11 (dB) | Absolute gain Ga (dBi) | Working gain Gw (dBi) |
| Example 20 (Metal plate) | 0.925 | −3.79 | 5.05 | 2.70 |
| Comparative Example 11 | 1.055 | −2.11 | 1.97 | −2.17 |
| Comparative Example 12 | 1.005 | −0.60 | −1.34 | −10.20 |

Figure 22:
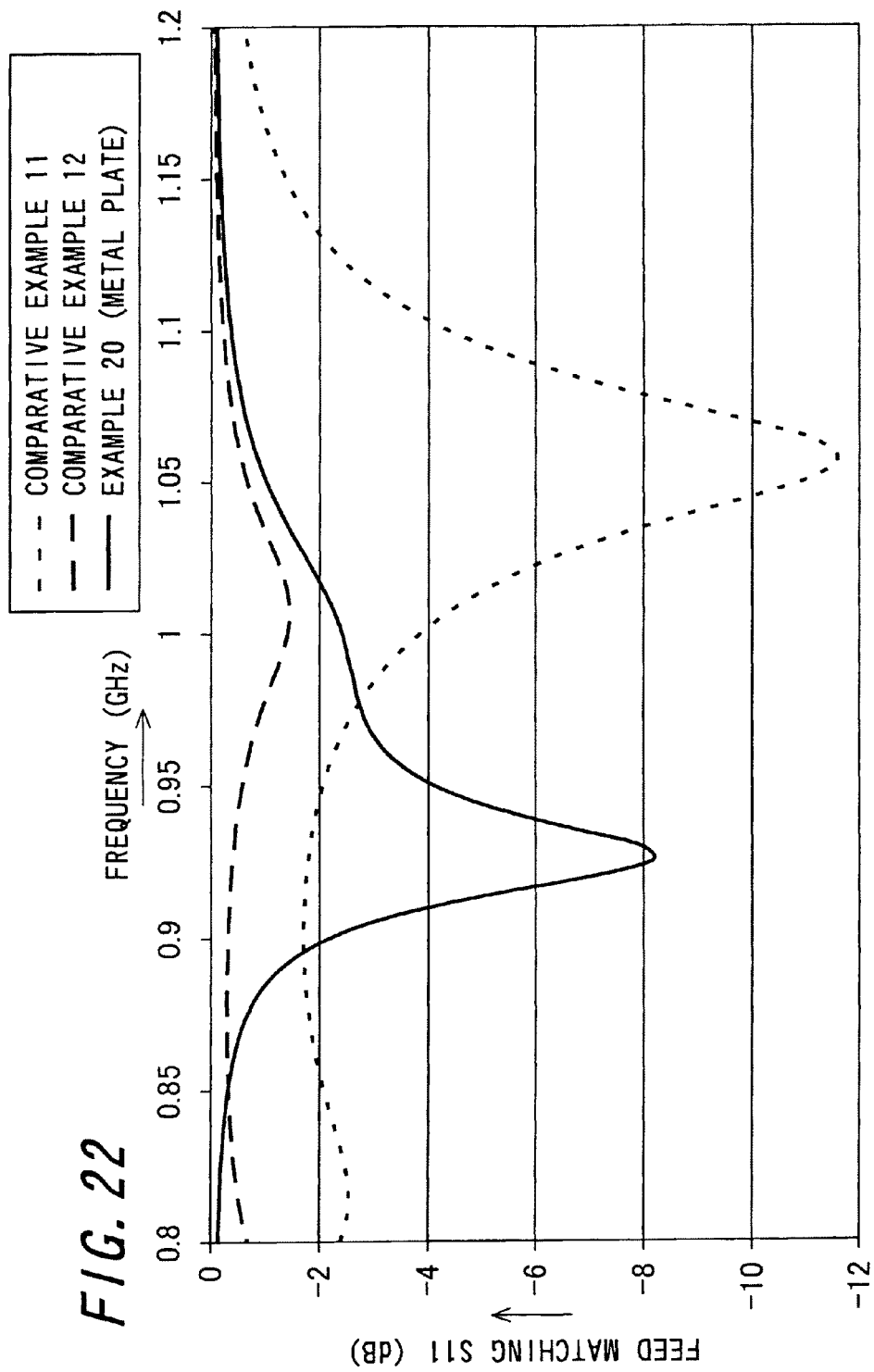
FIG. 22 is a graph illustrating feed matching S11 characteristics in Example 20 and Comparative Examples 11 and 12.
Figure 23:
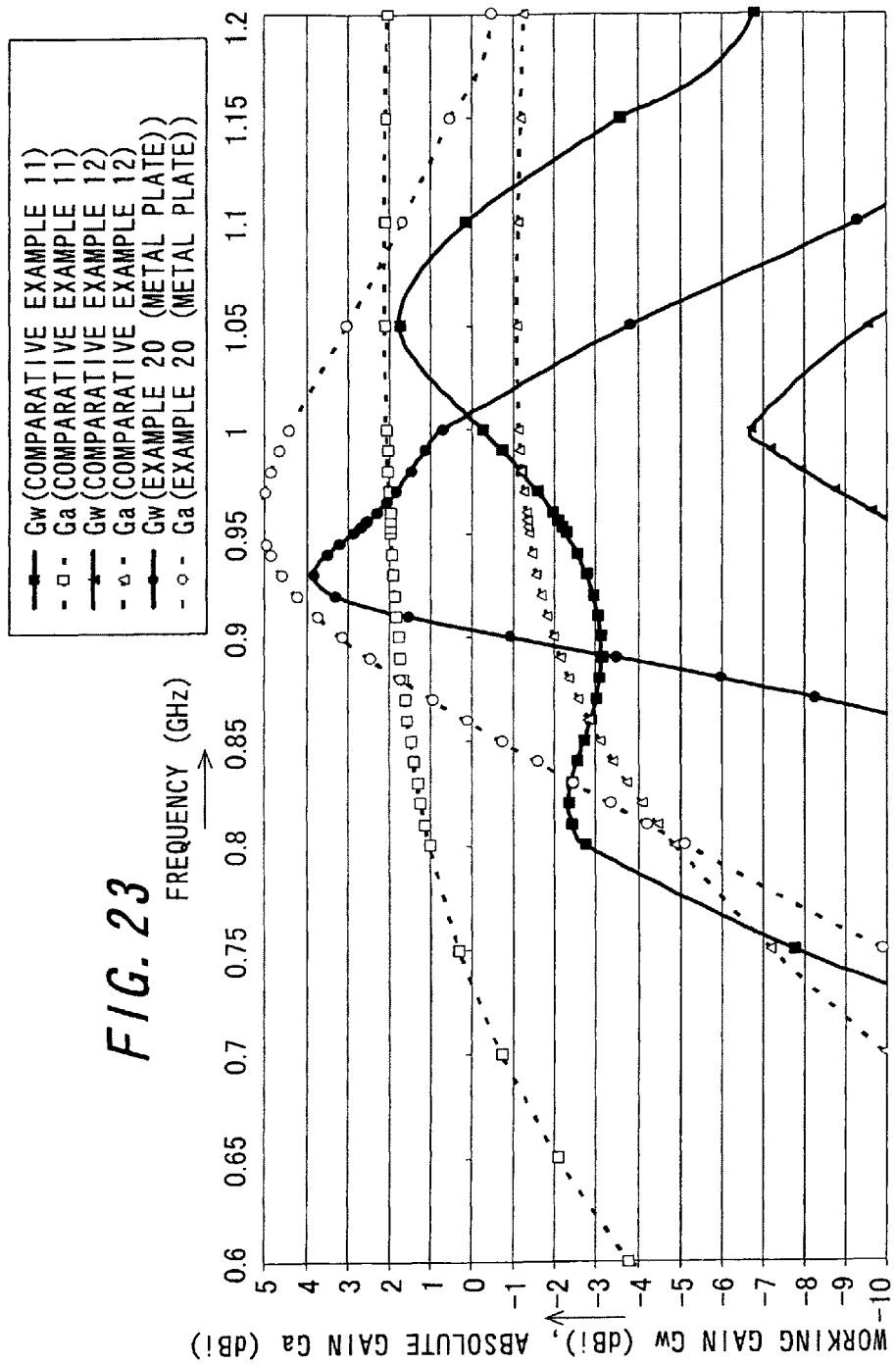
FIG. 23 is a graph illustrating a working gain Gw and an absolute gain Ga as radiation characteristics in Example 20 and Comparative Examples 11 and 12.

FIG. 22 is a graph illustrating the relationship between the feed matching S11 and the frequency, and FIG. 23 is a graph illustrating the results obtained by simulating the relationship among the working gain Gw, the absolute gain Ga and the frequency as radiation characteristics. When the working gain Gw and the absolute gain Ga have a high value, it represents excellent communication properties.

As illustrated in FIG. 22, the resonance frequency of Comparative Example 11 is shifted to a high frequency side. However, this is based on the assumption that the wireless IC tag is attached to a material with a high dielectric constant, and the design in which it is anticipated that the resonance frequency at that time will be shifted to a low frequency side. In Comparative Example 12, resonance is nearly unseen.

Compared with this, Example 20 shows a wide resonance frequency band over the range of 900 MHz to 950 MHz of the UHF band. According to Example 20, since the wireless IC tag has a metal-compatible tag configuration in which a conductor layer is provided on the rear surface thereof, a communication frequency range can be made to coincide with a resonance frequency band. As a result, the invention can obtain stable communication properties even when the wireless IC tag is attached to any material.

As illustrated in FIG. 23, according to Example 20, the working gain Gw and the absolute gain Ga have a high value in the communication band of 900 MHz to 1,000 MHz, as compared with Comparative Example 11. In terms of a comprehensive communication band, Comparative Example 11 is superior to Example 20. However, according to Example 20, in the wide RFID communication frequency band of the UHF band, it can be understood through the simulation that communication properties corresponding to about twice that of the commercialized wireless IC tag are obtained.

Under normal conditions, as in the case of Comparative Example 12, communication properties are significantly degraded due to the existence of an adjacent metal. However, according to Example 20, communication properties better than that of Comparative Example 11 are obtained.

Figure 24:
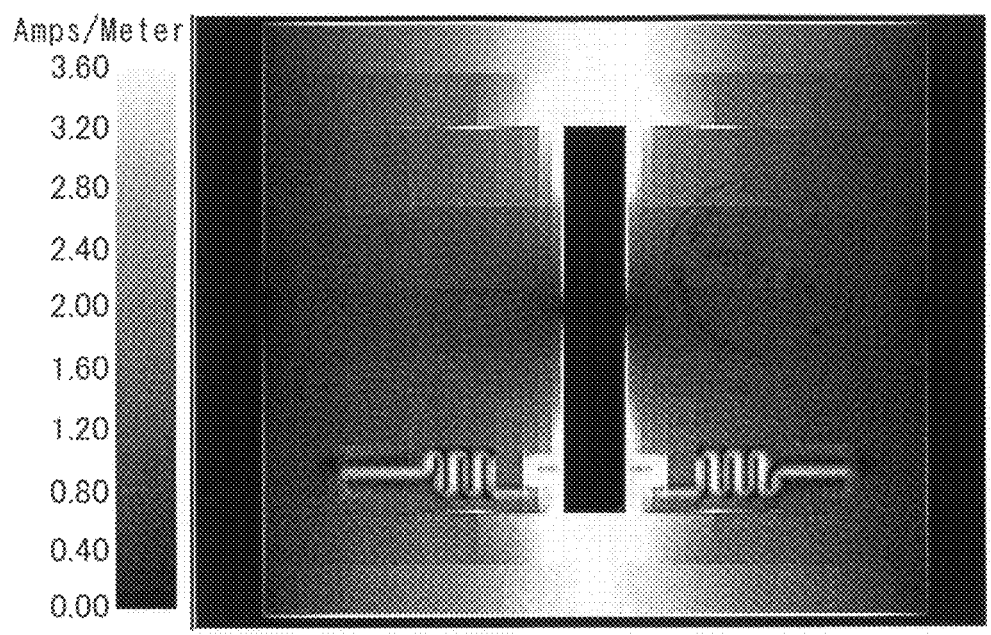
FIG. 24 is a diagram illustrating simulation results of the resonance current distribution according to Example 20.
Figure 25:
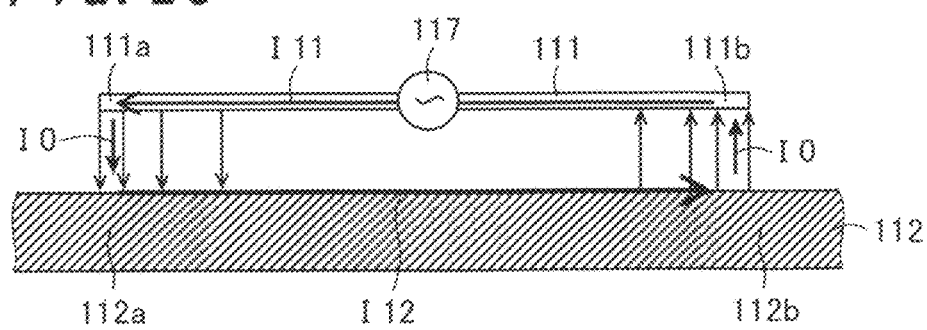
FIG. 25 is a cross-sectional view illustrating an electric field formed in the vicinity of a wireless IC tag 20 in the state in which the wireless IC tag 20 is arranged in the vicinity of a conductive member.

In order to find out this cause, a resonance current distribution for radio waves of 953 MHz according to Example 20 is calculated through the simulation. FIG. 24 is a diagram illustrating the simulation results of the resonance current distribution according to Example 20.

In FIG. 24, a white part indicates a resonance part. Although the resonance of the wireless IC tag is partially recognized, strong resonance in the auxiliary antenna and the slot is observed. Consequently, the resonance of the wireless IC tag overlaps the resonance of the auxiliary antenna, so that good communication properties can be obtained.

Each dimension of the configurations according to the above examples is only an example, and the invention is not limited thereto. When the effects of the invention can be obtained, optional shapes, sizes and configurations can be employed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

INDUSTRIAL APPLICABILITY

According to the invention, there is provided a wireless communication improving sheet that improves the wireless communication properties of a wireless IC tag when the wireless IC tag is arranged thereon.

The wireless communication improving sheet of the invention is an auxiliary antenna that can improve communication by simply laminating a commercially available wireless IC tag thereon, without depending on the type of attachment target article. The exchange of radio wave signals between the auxiliary antenna and the IC chip of the wireless IC tag is performed simply via the distribution of an electromagnetic field in space, without involving process such as conductive wiring, wiring connection, soldering, or the like. Here, the wireless communication improving sheet can achieve the impedance adjustment under these conditions, thereby realizing the resonant frequency adjustment and communication improvement.

A first spacer has an arrangement surface on which a wireless IC tag is arranged without a wired connection, and an auxiliary antenna is arranged on the first spacer on the opposite side to the arrangement surface. A second spacer is provided on an opposite side to the first spacer with the auxiliary antenna interposed therebetween.

The auxiliary antenna is formed with a hole or notch.

Consequently, the dipole antenna of the wireless IC tag is electromagnetically coupled to the auxiliary antenna through a hole or notch, and the communication improving effect due to the auxiliary antenna is exerted.

Further, according to the invention, the auxiliary antenna includes a single or a plurality of conductor parts, and at least one of the conductor parts serves as a resonator which resonates with respect to an electromagnetic wave used for wireless communication.

By resonating with electromagnetic waves used in wireless communication, wireless communication using the auxiliary antenna can be performed, and the communication improving effect is exerted.

Further, according to the invention, the auxiliary antenna includes a plurality of conductor parts divided in a planar direction or a lamination direction, and at least one of the plurality of conductor parts serves as a resonator which resonates with respect to the electromagnetic wave used for wireless communication.

In addition to the resonator which resonates with respect to the electromagnetic wave used for wireless communication, a conductor part may be provided, and a plurality of resonators are arranged in a line, so that an impedance matching function can be further provided, a wireless communication band can be expanded, and the communication improving effect is exerted.

Further, according to the invention, an adjusting unit formed with the hole or notch is provided for adjusting the resonance frequency of the wireless IC tag.

Consequently, impedance adjustment can be more reliably achieved and the communication improving effect is enhanced.

Further, according to the invention, the adjusting unit is made of at least one selected from the group consisting of dielectric materials and magnetic materials, so that the frequency band in which the wireless communication is possible can be expanded.

Further, according to the invention, the wireless communication improving sheet further comprises a rear surface conductor layer provided on a side opposite to the auxiliary antenna of the second spacer. Accordingly, the influence of the arrangement position of the wireless communication improving sheet (also including the type of the material) can be reduced.

Further, according to the invention, the conductor layer is larger than the conductor part provided in the auxiliary antenna. Consequently, the influence of the arrangement positions (including the type of materials to which the sheet is attached) of the wireless communication improving sheet can be more reliably reduced.

Further, according to the invention, at least a part of the conductor layer is configured to protrude in a resonance length direction of the conductor part provided in the auxiliary antenna.

Consequently, the intensity and directivity of a transmitted electromagnetic wave can be improved and the communication improving effect is enhanced.

Furthermore, according to the invention, the hole or notch is configured to face at least an IC chip or a reactance loading part provided in the wireless IC tag when the wireless IC tag is arranged.

Accordingly, the influence of the auxiliary antenna as a conductor material can be reduced, the communication improving effect can be further enhanced.

Furthermore, according to the invention, the hole or notch is provided such that the auxiliary antenna resonates with respect to electromagnetic waves used for wireless communication.

Accordingly, the communication improving effect of the auxiliary antenna can be further enhanced.

Furthermore, according to the invention, at least one of the first spacer and the second spacer is made of foamed member.

When foamed member is used, a light and thin wireless communication improving sheet can be provided.

Furthermore, according to the invention, a part or whole of an outer surface is coated with a dielectric material.

Accordingly, the influence of unnecessary electromagnetic waves from the outside and the influence of the surrounding environment is reduced, and the communication improving effect can be further enhanced.

Furthermore, according to the invention, at least one of the arrangement surface and the surface opposite to the arrangement surface has adhesion or bonding properties.

Accordingly, the arrangement of the wireless IC tag and the attachment to a target product can be easily performed.

Further, according to the invention, there is provided a wireless communication IC tag obtained by arranging a wireless IC tag on the arrangement surface of the wireless communication improving sheet, or by DC-coupling an IC chip to the wireless communication improving sheet without arranging a wireless IC tag on the wireless communication improving sheet.

Since the wireless IC tag is integrally formed with the wireless communication improving sheet, the wireless communication can be performed regardless of arrangement places and attachment places. In addition, even when the wireless communication improving sheet is attached to a target product as it is, it serves as a wireless communication IC tag which can be read.

Further, according to the invention, a wireless communication IC tag is combined with a wireless communication IC tag with a coil antenna performing the wireless communication through electromagnetic induction has improved the communication properties by using a magnetic material, so that the frequency band for wireless communication can be expanded.

Further, according to the invention, in the wireless communication IC tag, a part or whole of an outer surface of the wireless IC tag is coated with a dielectric material.

The wireless IC tag is coated with the dielectric material, so that endurance, weather resistance, impact resistance, printing properties and the like can be provided, and the impedance or the resonance frequency can be adjusted.

Further, according to the invention, there is provided an information transmitting medium comprising the wireless communication improving sheet or the wireless communication IC tag incorporated therein.

The information transmitting medium, for example, includes a slip, a verification, a card, a label and the like.

Even when the information transmitting medium such as a slip, a verification, a card or a label, is directly attached to products, intermediate products, parts and materials which include a metal material or a material having conductivity or a high dielectric constant, receptacles including these materials, transport equipment or moving means, the wireless IC tag communication can be performed.

Moreover, according to the invention, it is possible to realize a wireless communication system that prevents a reading error or a reading failure from occurring, by using at least the wireless IC tag or the antenna.

The invention claimed is:

1. A wireless communication improving sheet for improving wireless communication properties of a wireless IC tag by arranging the wireless IC tag, comprising:
a non-conductive first spacer having an arrangement surface that receives the wireless IC tag without connecting the wireless IC tag with a wire;
an auxiliary antenna provided on a surface of the first spacer opposite to the arrangement surface of the first spacer; and
a non-conductive second spacer provided on the auxiliary antenna on an opposite side to the first spacer with the auxiliary antenna interposed therebetween, they being laminated one on top of another,
the auxiliary antenna is formed with a hole or notch and is composed of one conductor part, wherein the hole or notch opens onto a surface of the second spacer and electromagnetically couples to the wireless IC tag by utilizing a region of the hole or notch where a magnetic field within the auxiliary antenna is strongest and an electric field within the auxiliary antenna is lowest, and
wherein a depth of the hole or notch is the same as the total thickness of the first spacer and the auxiliary antenna.

2. The wireless communication improving sheet of claim 1, further comprising an adjusting unit formed with the hole or notch the adjustment unit being provided for adjusting a resonance frequency of the wireless IC tag.

3. The wireless communication improving sheet of claim 2, wherein the adjusting unit is made of at least one material selected from the group consisting of a dielectric material and a magnetic material.

4. The wireless communication improving sheet of claim 1, further comprising a rear surface conductor layer provided on a side of the second spacer opposite to the auxiliary antenna.

5. The wireless communication improving sheet of claim 4, wherein the rear surface conductor layer is equal to or larger than the conductor part provided in the auxiliary antenna.

6. The wireless communication improving sheet of claim 5, wherein at least a part of the rear surface conductor layer protrudes in a resonance length direction of the conductor part provided in the auxiliary antenna.

7. The wireless communication improving sheet of claim 1, wherein the hole or notch is configured to face at least one of an IC chip and a reactance loading part provided in the wireless IC tag when the wireless IC tag is arranged thereon.

8. The wireless communication improving sheet of claim 1, wherein the hole or notch is provided such that the auxiliary antenna resonates with respect to an electromagnetic wave used for wireless communication.

9. The wireless communication improving sheet of claim 1, wherein at least one of the first spacer and the second spacer is made of a foamed member.

10. The wireless communication improving sheet of, claim 1, wherein a part or whole of an outer surface thereof is coated with a dielectric material.

11. The wireless communication improving sheet of claim 1, wherein at least one of the arrangement surface and the surface opposite to the arrangement surface has adhesion or bonding properties.

12. An information transmitting medium comprising the wireless communication improving sheet of claim 1.

13. The wireless communication improving sheet of claim 1, wherein the hole or notch passes through the first spacer and the auxiliary antenna in a lamination direction and the second spacer forms a bottom of the hole or notch.

14. A wireless communication IC tag, comprising:
a wireless communication improving sheet, including
a non-conductive first spacer having an arrangement surface that receives the wireless IC tag without connecting the wireless IC tag with a wire;
an auxiliary antenna provided on a surface of the first spacer opposite to the arrangement surface of the first spacer; and
a non-conductive second spacer provided on the auxiliary antenna on an opposite side to the first spacer with the auxiliary antenna interposed therebetween, they being laminated one on top of another, the auxiliary antenna being formed with a hole or notch, the hole or notch opening onto a surface of the second spacer and electromagnetically coupling to the wireless IC tag by utilizing a region of the hole or notch where a magnetic field within the auxiliary antenna is strongest and an electric field within the auxiliary antenna is lowest;
wherein a depth of the hole or notch is the same as the total thickness of the first spacer and the auxiliary antenna; and
a wireless IC tag on the arrangement surface of the wireless communication improving sheet.

15. The wireless communication IC tag of claim 14, further comprising a coil antenna configured to perform wireless communication through electromagnetic induction, the coil antenna including a magnetic material.

16. The wireless communication IC tag of claim 14, wherein a part or whole of an outer surface thereof is coated with a dielectric material.

17. A wireless communication system using the wireless communication IC tag of claim 14.

18. The wireless communication improving sheet of claim 14, further comprising a rear surface conductor layer provided on a side of the second spacer opposite to the auxiliary antenna.

19. The wireless communication improving sheet of claim 18, wherein the rear surface conductor layer is equal to or larger than the conductor part provided in the auxiliary antenna.

20. The wireless communication improving sheet of claim 19, wherein at least a part of the rear surface conductor layer protrudes in a resonance length direction of the conductor part provided in the auxiliary antenna.

21. The wireless communication IC tag of claim 15, wherein a part or whole of an outer surface thereof is coated with a dielectric material.

22. An information transmitting medium comprising the wireless communication IC tag of claim 14 incorporated therein.

23. An information transmitting medium comprising the wireless communication IC tag of claim 15 incorporated therein.

24. A wireless communication IC tag, comprising:
a wireless communication improving sheet, including
  a non-conductive first spacer having an arrangement surface that receives the wireless IC tag without connecting the wireless IC tag with a wire;
  an auxiliary antenna provided on a surface of the first spacer opposite to the arrangement surface of the first spacer; and
  a non-conductive second spacer provided on the auxiliary antenna on an opposite side to the first spacer with the auxiliary antenna interposed therebetween, they being laminated one on top of another, the auxiliary antenna being formed with a hole or notch, the hole or notch opening onto a surface of the second spacer and electromagnetically coupling to the wireless IC tag by utilizing a region of the hole or notch where a magnetic field within the auxiliary antenna is strongest and an electric field within the auxiliary antenna is lowest;
  wherein a depth of the hole or notch is the same as the total thickness of the first spacer and the auxiliary antenna; and
an IC chip coupled to the wireless communication improving sheet.

25. The wireless communication IC tag of claim 24, further comprising a coil antenna configured to perform wireless communication through electromagnetic induction, the coil antenna including a magnetic material.

26. The wireless communication IC tag of claim 24, wherein a part or whole of an outer surface thereof is coated with a dielectric material.

27. The wireless communication IC tag of claim 25, wherein a part or whole of an outer surface thereof is coated with a dielectric material.

28. An information transmitting medium comprising the wireless communication IC tag of claim 24 incorporated therein.

29. An information transmitting medium comprising the wireless communication IC tag of claim 25 incorporated therein.

* * * * *